United States Patent [19]
Nakai et al.

[11] Patent Number: 5,642,718
[45] Date of Patent: Jul. 1, 1997

[54] IN-TANK FUEL PUMP APPARATUS HAVING IMPROVED STRUCTURE FOR DISSIPATING ELECTROSTATIC CHARGES

[75] Inventors: Hideyuki Nakai, Oobu; Kenji Okabe, Kariya; Katsuhisa Yamada, Okazaki; Yukihiro Okane, Toyota, all of Japan

[73] Assignees: Nippondenso Co., Ltd., Kariya; Toyota Kidosha Kabushiki Kaisha, Toyota, both of Japan

[21] Appl. No.: 683,462

[22] Filed: Jul. 18, 1996

[30] Foreign Application Priority Data

Jul. 18, 1995 [JP] Japan .................................. 7-181475

[51] Int. Cl.$^6$ .................................................. F02M 37/04
[52] U.S. Cl. ............................................. 123/497; 123/509
[58] Field of Search .................................. 123/495, 497, 123/509

[56] References Cited

U.S. PATENT DOCUMENTS

| | | | |
|---|---|---|---|
| 5,076,920 | 12/1991 | Danowski et al. | |
| 5,103,793 | 4/1992 | Riese et al. | 123/509 |
| 5,164,084 | 11/1992 | Danowski et al. | |
| 5,164,874 | 11/1992 | Okano et al. | |
| 5,231,967 | 8/1993 | Baltz et al. | 123/509 |
| 5,338,163 | 8/1994 | Frank et al. | 123/497 |
| 5,456,235 | 10/1995 | Porter | 123/509 |
| 5,564,396 | 10/1996 | Kleppner et al. | 123/509 |

FOREIGN PATENT DOCUMENTS

| | | |
|---|---|---|
| 50-77878 | 11/1948 | Japan . |
| 61-8102 | 1/1986 | Japan . |
| 3-105055 | 5/1991 | Japan . |
| WO92/04097 | 3/1992 | WIPO . |

*Primary Examiner*—Thomas N. Moulis
*Attorney, Agent, or Firm*—Cushman Darby & Cushman IP Group Of Pillsbury Madison & Sutro, LLP

[57] ABSTRACT

A fuel pump apparatus disposed within a fuel tank which may be employed in automotive vehicles is disclosed. The fuel pump apparatus includes a fuel pump, a filter, and a conductive member. The fuel pump is disposed within a conductive pump housing. The filter includes a filter element and a conductive filter casing. The filter element removes particles contained in fuel which is discharged from the fuel pump and returned to the fuel tank. The conductive member electrically connects between the pump housing and the filter casing for dissipating electrostatic charges generated by the friction between the filter element and the fuel passing through the filter element.

8 Claims, 31 Drawing Sheets

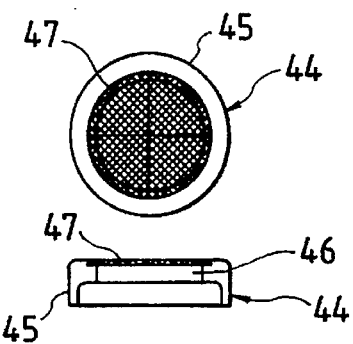
FIG. 10(a)
FIG. 10(b)
FIG. 11
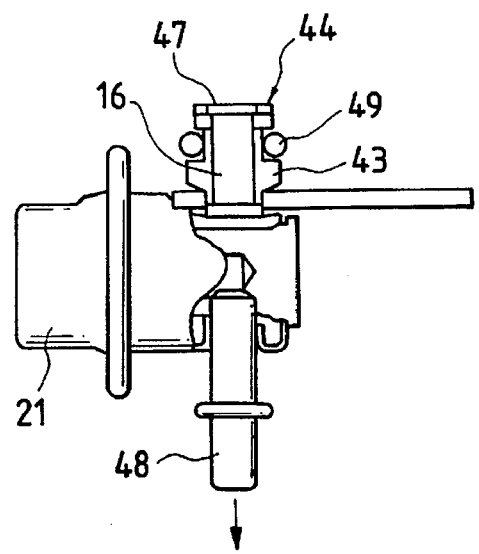
FIG. 12
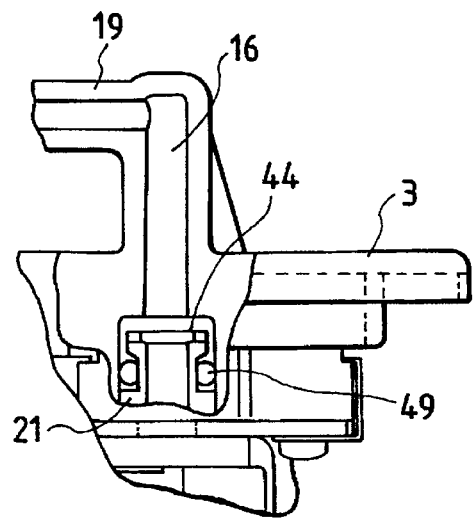

FIG. 17(a)
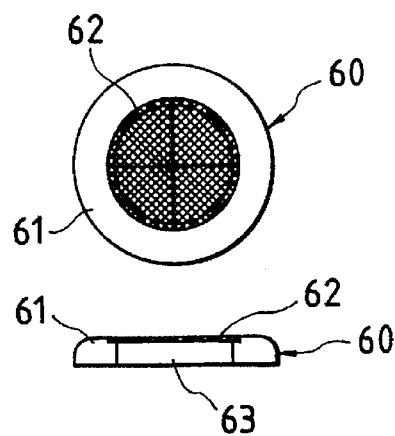
FIG. 17(b)
FIG. 18
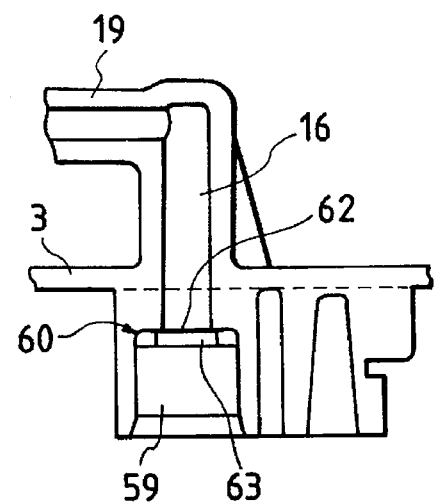
FIG. 19
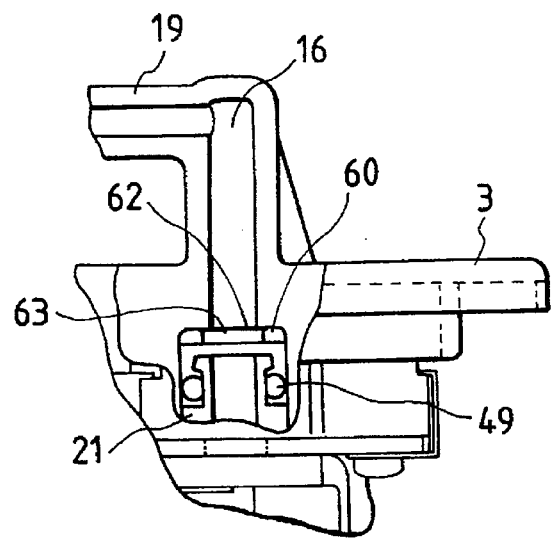

IN-TANK FUEL PUMP APPARATUS HAVING IMPROVED STRUCTURE FOR DISSIPATING ELECTROSTATIC CHARGES

BACKGROUND OF THE INVENTION

1. Technical Field

The present invention relates generally to an in-tank fuel pump apparatus having a fuel pump and a fuel filter disposed within a fuel tank which may be employed in fuel supply systems for automotive vehicles. More particularly, the invention is directed to an improved structure of an in-tank fuel pump for achieving electrostatic dissipation.

2. Background of Related Art

Japanese Patent First Publication No. 3-105055 assigned to the same assignee as that of this application teaches a fuel supply apparatus for automotive vehicles. The fuel supply apparatus includes a fuel pump disposed within a fuel tank. The fuel pump discharges fuel out of the fuel tank through a discharge pipe and sprays it into combustion chambers of an engine through fuel injectors. An excess of the fuel is returned to a sub-tank through a return pipe.

The above prior art fuel supply apparatus, however, encounters the following drawback. Mounting members for component parts such as the fuel pump and so forth are made of a metallic material. Screws and clips are used to fix the component parts. The assembling of the apparatus, thus, requires a great number of surface treatment processes for brazed and welded portions, resulting in increased total manufacturing costs of the apparatus.

Further, a technique is well known in the art wherein a fuel pump, a pressure regulator, and a fuel filter are disposed within a fuel tank to simplify the structure of a return pipe arranged outside the fuel tank for returning the fuel to the fuel tank through the fuel filter. Such a fuel supply system has disadvantages that friction between a filter element and the fuel passing through the filter element produces electrostatic charges, which may cause resin-made parts to be broken or damaged. In order to dissipate the electrostatic charges, the use of an earth circuit is preferred, but undesirably increases component parts.

Another type of fuel supply system is known in the art which returns through a pressure regulator part of fuel discharged from a fuel pump to a fuel tank. In this system, only fuel to be consumed in an engine passes through a fuel filter, while most of the fuel discharged from the fuel pump is returned to the fuel tank through the pressure regulator. Specifically, most of the fuel returned to the fuel tank does not pass through the fuel filter, thereby causing a pump filter to be blocked or friction to occur in the fuel tank. Further, the use of a fuel filter in a return pipe of a pressure regulator is proposed, but this technique has the disadvantage that foreign substances existing in a fuel passage line extending from an outlet port of the fuel pump to an inlet port of the pressure regulator may enter the pressure regulator, causing friction to occur in the pressure regulator resulting in wear or breakage of the pressure regulator.

SUMMARY OF THE INVENTION

It is therefore a principal object of the present invention to avoid the disadvantages of the prior art.

It is another object of the present invention to provide a simple structure of an in-tank fuel pump apparatus which is designed to dissipate electrostatic charges generated on a fuel filter disposed within a fuel tank.

It is a further object of the invention to provide an easy-to-assemble structure of an in-tank fuel pump which is designed to prevent foreign substances contained in fuel to enter a pressure regulator disposed within a fuel tank.

According to one aspect of the invention, there is provided a fuel pump apparatus which comprises: (a) a fuel pump retained within the fuel tank through a retaining means for pumping out fuel stored within the fuel tank from an inlet and discharging the fuel through an outlet communicating with a fuel supply line and a fuel return line connected to the fuel tank, said fuel pump having a pump housing made of a conductive material insulated from a ground terminal of a power source for said fuel pump; (b) a filter for removing foreign substances contained in part of the fuel discharged from said fuel pump delivered to the fuel return line, said filter including a filter casing made of a conductive material which is electrically insulated from the ground terminal of the power source for said fuel pump and is supported by the retaining means; and (c) an electrical connection means for electrically connecting the pump housing of said fuel pump and the filter casing of said filter.

In the preferred mode of the invention, the ground terminal of the power source is one of a positive terminal and a negative terminal connected to ground.

The electrical connection means includes a conductive member elastically supported by the filter casing of said filter.

According to another aspect of the invention, there is provided a fuel pump apparatus which comprises: (a) a fuel pump retained for pumping out fuel stored within the fuel tank from an inlet and discharging the fuel through an outlet communicating with a fuel supply line and a fuel return line connected to the fuel tank, said fuel pump having a pump casing and a pump housing covered with the pump casing having disposed therein said fuel pump, the pump casing being retained by the fuel tank through a retaining means and made of a conductive material insulated from a ground terminal of a power source for said fuel pump; (b) a filter for removing foreign substances contained in part of the fuel discharged from said fuel pump delivered to the fuel return line, said filter including a filter casing made of a conductive material which is electrically insulated from the ground terminal of the power source for said fuel pump and is supported by the retaining means; and (c) an electrical connection means for electrically connecting the pump casing of said fuel pump and the filter casing of said filter.

In the preferred mode of the invention, the pump casing of said fuel pump electrically communicates with the pump housing.

The electrical connection means includes a conductive member elastically supported by the filter casing of said filter.

The pump casing of said fuel pump is made of a conductive resin. The electrical connection means includes a first engaging portion and a second engaging portion engaging with each other. The first engaging portion Is formed on the pump casing of said fuel pump. The second engaging portion is formed on the filter casing of said filter.

The first engaging portion includes a C-shaped protrusion formed on the pump casing. The second engaging portion includes a T-shaped protrusion formed on the filter casing inserted into the C-shaped protrusion to achieve electrical communication between the pump casing and the filter casing.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 10(a) is a plan view which shows a third filter;

FIG. 10(b) is a cross sectional view which shows the third filter in FIG. 10(a);

FIG. 11 is a partially cross sectional view which shows a third filter fitted on an inlet port of a pressure regulator;

FIG. 12 is a partially cross sectional view which shows a mounting arrangement of an inlet port of a pressure regulator;

FIG. 17(a) is a plan view which shows a fuel filter;

FIG. 17(b) is a cross sectional view which shows the fuel filter in FIG. 17 (a);

FIG. 18 is a cross sectional view which shows a fuel filter disposed within a connecting portion of fuel return passage to a pressure regulator;

FIG. 19 is a cross sectional view which shows a connecting arrangement of a fuel return passage and an outlet port of a pressure regulator;

DESCRIPTION OF THE PREFERRED EMBODIMENT

Figure 1:
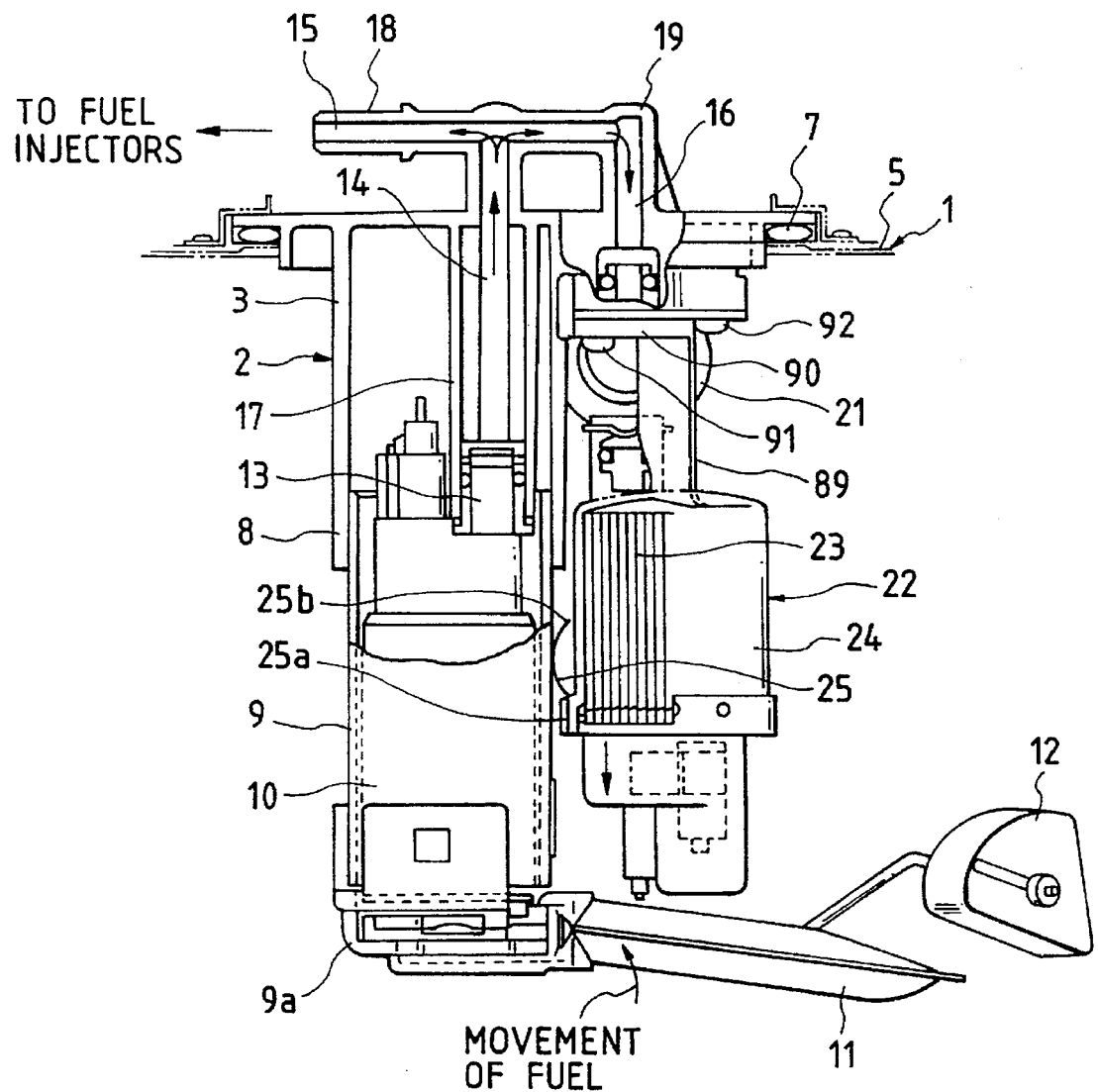
FIG. 1 is a partially cross sectional view which shows a fuel pump apparatus according to the first embodiment of the invention.

Referring now to the drawings, wherein like reference numbers refer to like parts throughout several views, particularly to FIG. 1, there is shown a fuel pump apparatus according to the present invention which may be employed in fuel supply systems of automotive vehicles.

This embodiment features electric connection of a pump casing having disposed therein a fuel pump to a filter casing having disposed therein a fuel filter element using a conductive element.

A non-conductive resin-made flange 3 is mounted on an upper tank portion 5 of a metallic fuel tank 1 through a gasket 7. The flange 3 has a cylindrical support 8 extending downward, as viewed in the drawing, in the fuel tank 1. A pump casing 9 is partially inserted into a lower end of the cylindrical support 8 and fixed thereby. The pump casing 9 is made of a conductive resin material and has disposed therein a fuel pump 10. The pump casing 9 opens at its upper end and is closed at a lower end by a cover 9a made of a non-conductive resin material. The cover 9a supports a lower end of the fuel pump 10. The pump casing 9 is coupled to the support 8 using an elastic member. Similarly, the cover 9a is coupled to the pump casing 9 using an elastic member. An inner wall of the pump causing 9 is in contact with a metallic pump housing of the fuel pump 10. Specifically, the pump casing 9 electrically communicates with the pump housing of the fuel pump 10. The pump housing of the fuel pump 10 are insulated from positive and negative terminals of a power source for the fuel pump 10. Thus, the pump housing of the fuel pump 10 is electrically insulated from the negative terminal of the power source or ground provided by the body of the vehicle at all.

The fuel pump 10 has disposed on a suction side a fuel filter 11 functioning as a primary filter. A sender gage 12 is mounted on the primary filter 11 which monitors the level of fuel stored in the fuel tank 1.

The fuel pump 10 has an outlet port 13 which engages a lower end of a cylinder 17 formed in the flange 3, defining therein a fuel passage 14. The fuel passage 14 communicates with an L-shaped fuel supply passage 15 defined in a main tube 18 projecting upward from the upper surface of the flange 3. A return tube 19 extends from a corner of the L-shaped portion of the main tube 18 and defines therein an L-shaped fuel return passage 16. The fuel return passage 16 communicates at an end with the fuel passage 14 and at the other end with the inside of the fuel tank 1.

A pressure regulator 21 is disposed on a portion of the flange 3 communicating with the fuel return passage 16. A fuel filter 22 functioning as a secondary filter is disposed at an outlet port of the pressure regulator 21. The secondary filter 22 opens at its outlet port into the fuel tank 1.

The secondary filter 22 includes a cylindrical filter casing 24 having disposed therein a filter element 23. The filter casing 24 is made of a conductive resin material and secured on the flange 3 through a support 89. The support 89 has an L-shaped portion 90 which is fixed on the lower surface of the flange 3 through bolts 91 and 92. Thus, the filter casing 24 is insulated from the fuel tank 1 since the flange 3 is non-conductive.

A terminal 25 is connected at a lower end 25 to a portion of a lower periphery of the filter casing 24 opposite the pump casing 9. The terminal 25 is made of a conductive and elastic material and, as shown in FIG. 1, engages at an upper end 25b a portion of the periphery of the pump casing 9. This establishes electric communication between the filter casing 24 and the pump casing 9. The terminal 25 is supported at a single support point by the filter casing 24 so as to project therefrom. In order to assure the strength of the terminal 25, the width thereof is increased as approaching the filter casing 24.

The part of the fuel discharged from the outlet port 13 of the fuel pump 10 passes through the fuel passage 14 and the fuel supply passage 15 and then is supplied to fuel injectors (not shown) of the engine, while an excess of the discharged fuel flows through the fuel return passage 16 and then is returned to the fuel tank 1 through the pressure regulator 21 and the filter element 23 of the secondary filter 22. During the passage of the fuel through the secondary filter 22, friction is generated by the flow of the fuel and the filter element 23, thereby producing electrostatic charges. The electrostatic charges electrically communicate with the pump casing 9 through the filter casing 24 and the terminal 25. Specifically, the electrostatic charges produced on the filter element 23 are transmitted not only to the filter casing 24, but also to the pump casing 9 through the terminal 25 and then discharged outside of the fuel tank 1 through water contained in the fuel around the pump casing 9. In this embodiment, the flange 3, the support 8, and the pump casing 9 form a bracket. The flange 3 is, as described above, non-conductive. Therefore, component parts of the fuel pump apparatus supported through the flange 3 are insulated from the fuel tank 1 as a negative electrode connected to the power source of the fuel pump 10 at the same potential as that of the vehicle body.

According to this embodiment, the electric charges produced by the friction between the filter 23 and the fuel flowing through the filter 23 are discharged or dissipated widely over conductive members such as the filter casing 24 and the pump casing 9 in contact with the fuel in the fuel tank 1. This prevents the filter casing 24 from being electrified without use of an electrical path transferring the electric charges from the filter casing 24 out of the fuel tank 1, thereby avoiding damage of resin members or spark generation due to contact of the filter casing 24 with the fuel tank 1 upon removal of the secondary filter 22.

The pump casing 9 is made of a resin member mixed with carbon powder so that it is conductive and has good thermal conductivity and a high friction coefficient. This improves heat dissipation from the fuel pump 10 and engagement of the support 8 with the cover 9a. Further, the terminal 25 elastically engages the pump casing 9, thereby compensating for dimensional errors or vibration-caused deformation of the component parts of the fuel pump apparatus to achieve electric communication between the filter casing 24 and the pump casing 9 at all times.

Figure 2:
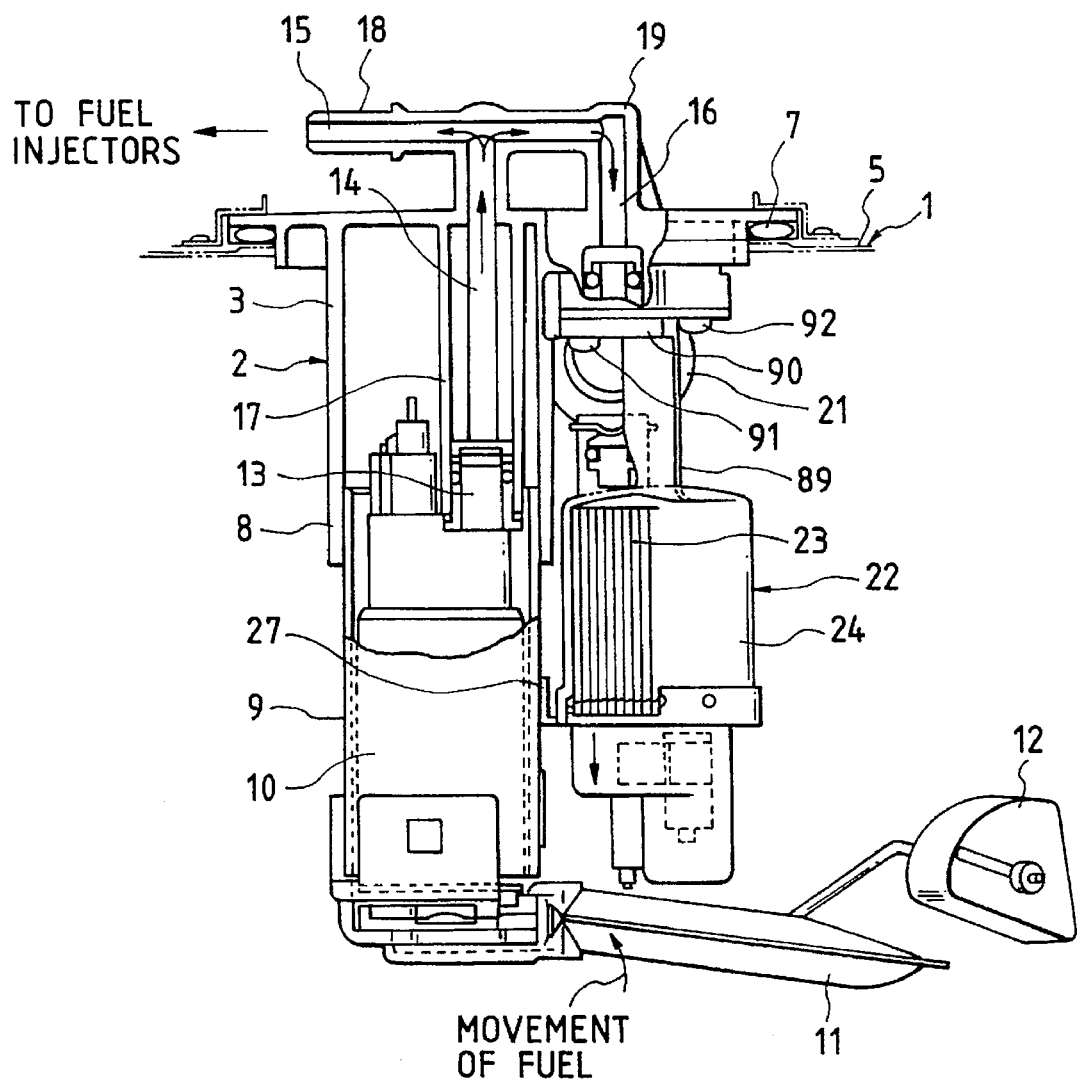
FIG. 2 is a partially cross sectional view which shows a fuel pump apparatus according to the second embodiment of the invention.

FIG. 2 shows a second embodiment of the fuel pump apparatus which is different from the above first embodiment only in that a clamp 27 is provided which is integrally formed with the filter casing 24 in place of the terminal 25 used in the first embodiment. Other arrangements are identical, and explanation thereof in detail will be omitted here.

The filter element 23 and the pump casing 9 are mechanically connected through the clamp 27. The clamp 27 is formed with a portion of the filter casing 24 and made of a conductive material. The clamp 27 is of U-shape extending upward from the lower end of the filter casing 24, and its top is pressed against a portion of the periphery of the pump casing 9. Specifically, an outer surface of the clap 27 is in contact with the pump casing 9 elastically and electrically.

With the above arrangements, the electrostatic charges produced by the friction between the filter element 23 and the fuel flowing through the filter element 23 are transmitted to the filter casing 24 and then to the pump casing 9 through the clamp 27. The electrostatic charges then spread over a wide discharging area of the filter casing 24 and the pump casing 9 and are discharged outside the fuel tank 1 through water contained in the fuel in the fuel tank 1.

Figure 3:
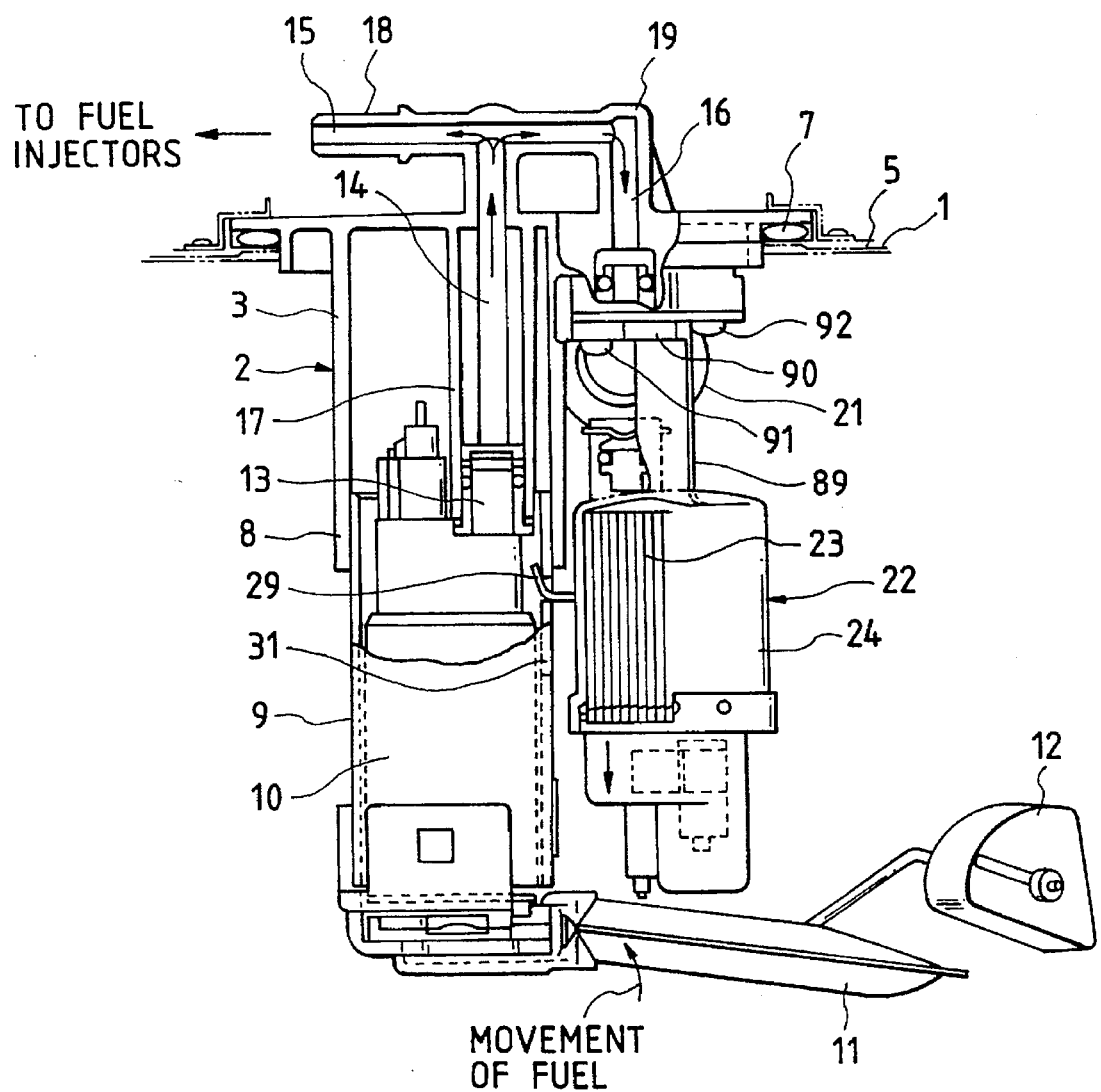
FIG. 3 is a partially cross sectional view which shows a fuel pump apparatus according to the third embodiment of the invention.

FIG. 3 shows a third embodiment of the fuel pump apparatus which is different from the above embodiments only in that a clamp 29 is provided which is formed on the filter casing 24 and inserted into a window 31 formed in the pump casing 9 to establish electrical and mechanical connection between the filter casing 24 and the pump casing 9.

Other arrangements are identical, and explanation thereof in detail will be omitted here.

The clamp 29 is formed with a portion of the filter casing 24 which extends outward in a radial direction and is bent to have a J-shape. The top of the clamp 29 is inserted into the window 31 and elastically engages an inner wall of the pump casing 9 above the window 31. This achieves electric communication between the filter casing 24 and the pump casing 9.

Figure 4:
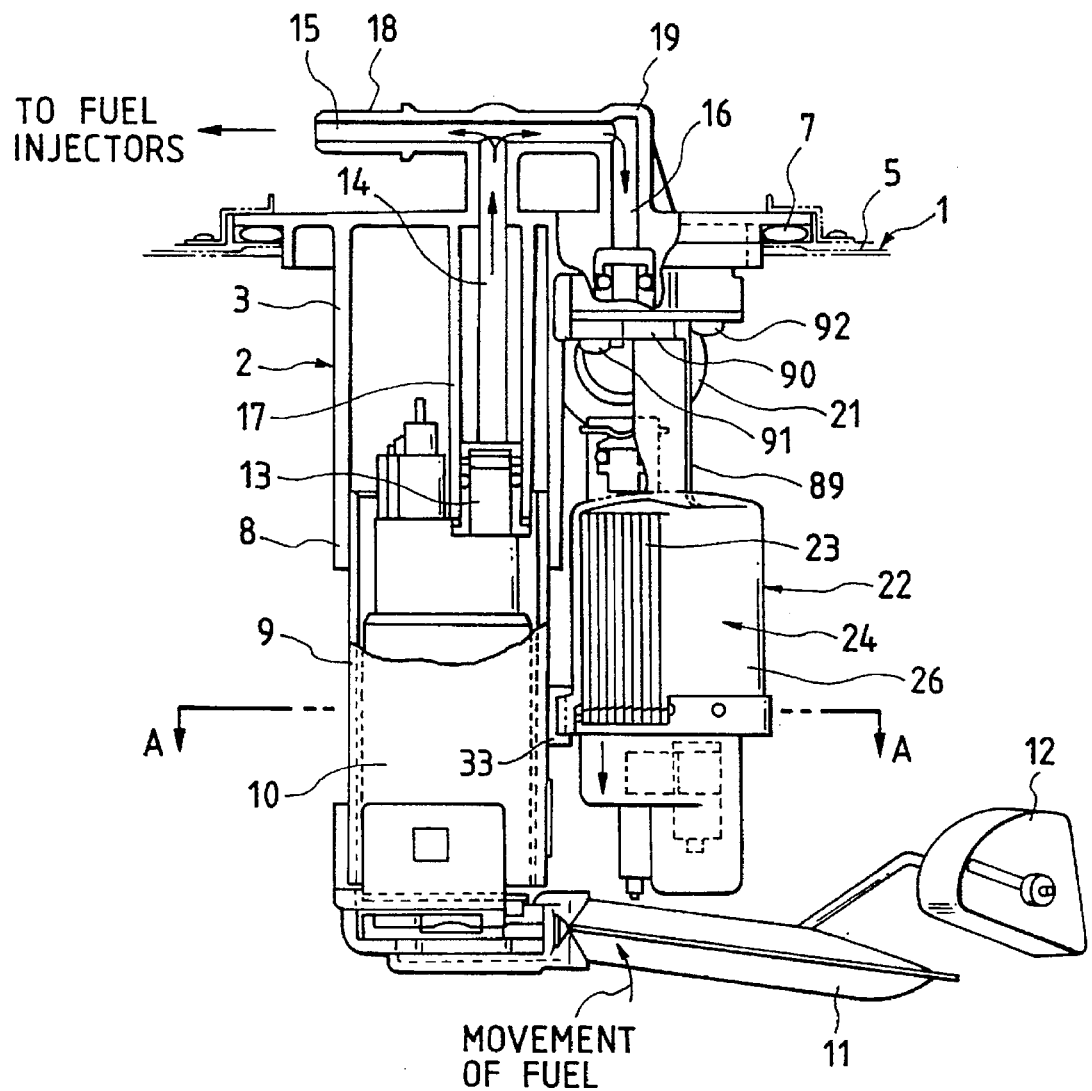
FIG. 4 is a partially cross sectional view which shows a fuel pump apparatus according to the fourth embodiment of the invention.
Figure 5:
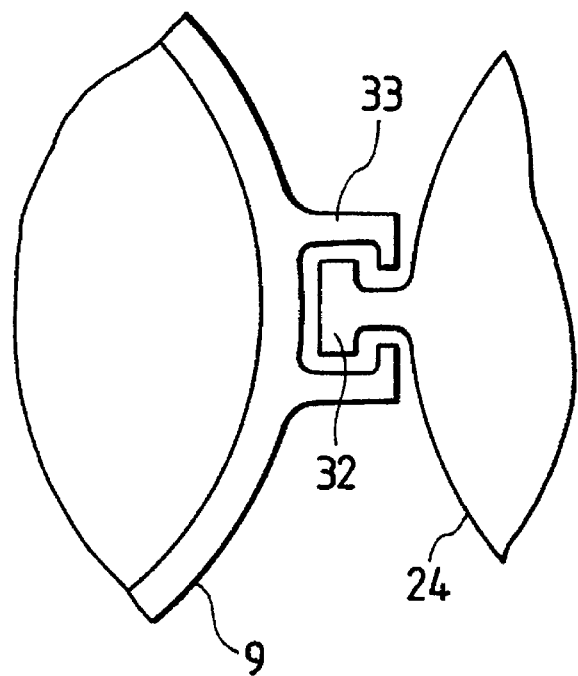
FIG. 5 is a partially cross sectional view taken along the line A—A in FIG. 4.

FIGS. 4 and 5 show a fourth embodiment of the fuel pump apparatus.

As clearly shown in FIG. 5, the pump casing 24 has a conductive protrusion 32 of a T-shape in transverse cross section formed on a lower portion of a side wall 26 thereof. The pump casing 9 has a conductive protrusion 33 of a C-shape in transverse cross section formed on a side wall thereof. The protrusion 32 is inserted into the protrusion 33 to achieve electric communication between the filter casing 24 and the pump casing 9. In FIG. 5, the protrusion 32 is viewed as being separate from the protrusion 33, however, they are, in practice, electrically connected to each other at other portions.

The connection between the protrusion 32 and the protrusion 33 upon assembling is easily accomplished by moving the pump casing 24 relative to the filter casing 24 in an axial direction of the apparatus. This provides for ease of assemble of the apparatus.

Additionally, the engagement between the protrusions 32 and 33 withstands lateral movement of the fuel pump 10 and the secondary filter 22 caused by the wave motion of the fuel in the fuel tank 1 produced upon movement of the vehicle body, thereby assuring the electric communication between the pump casing 9 and the filter casing 24 at all times.

Figure 6:
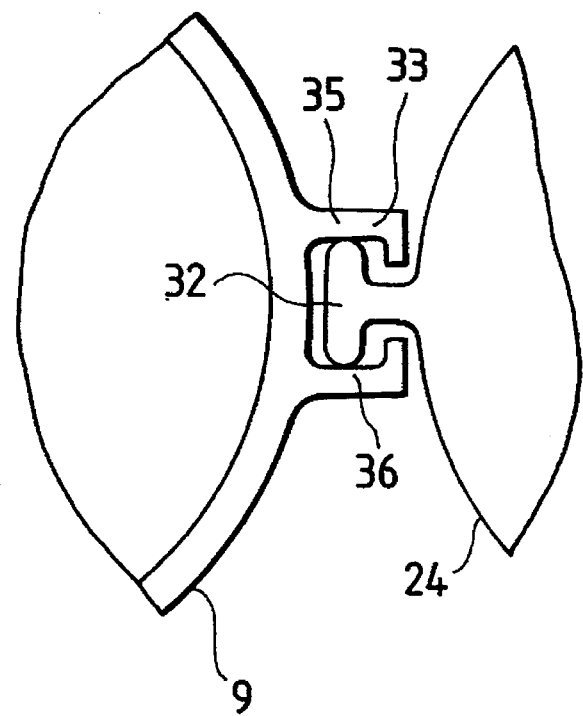
FIG. 6 is an illustration showing a modification of the one shown in FIG. 5.

FIG. 6 shows a modification of the fourth embodiment.

The protrusion 32 extending from the filter casing 24 includes rounded side extensions 35 and 36. A distance between ends of the side extensions 35 and 36 is slightly greater than a distance between inner side walls of the protrusion 33 for establishing tight engagement between the protrusions 35 and 33. This also improves the electric communication between the filter casing 24 and the pump casing 9 during movement of the fuel pump 10 and the secondary filter 22 caused by the wave motion of the fuel in the fuel tank 1.

Figure 7:
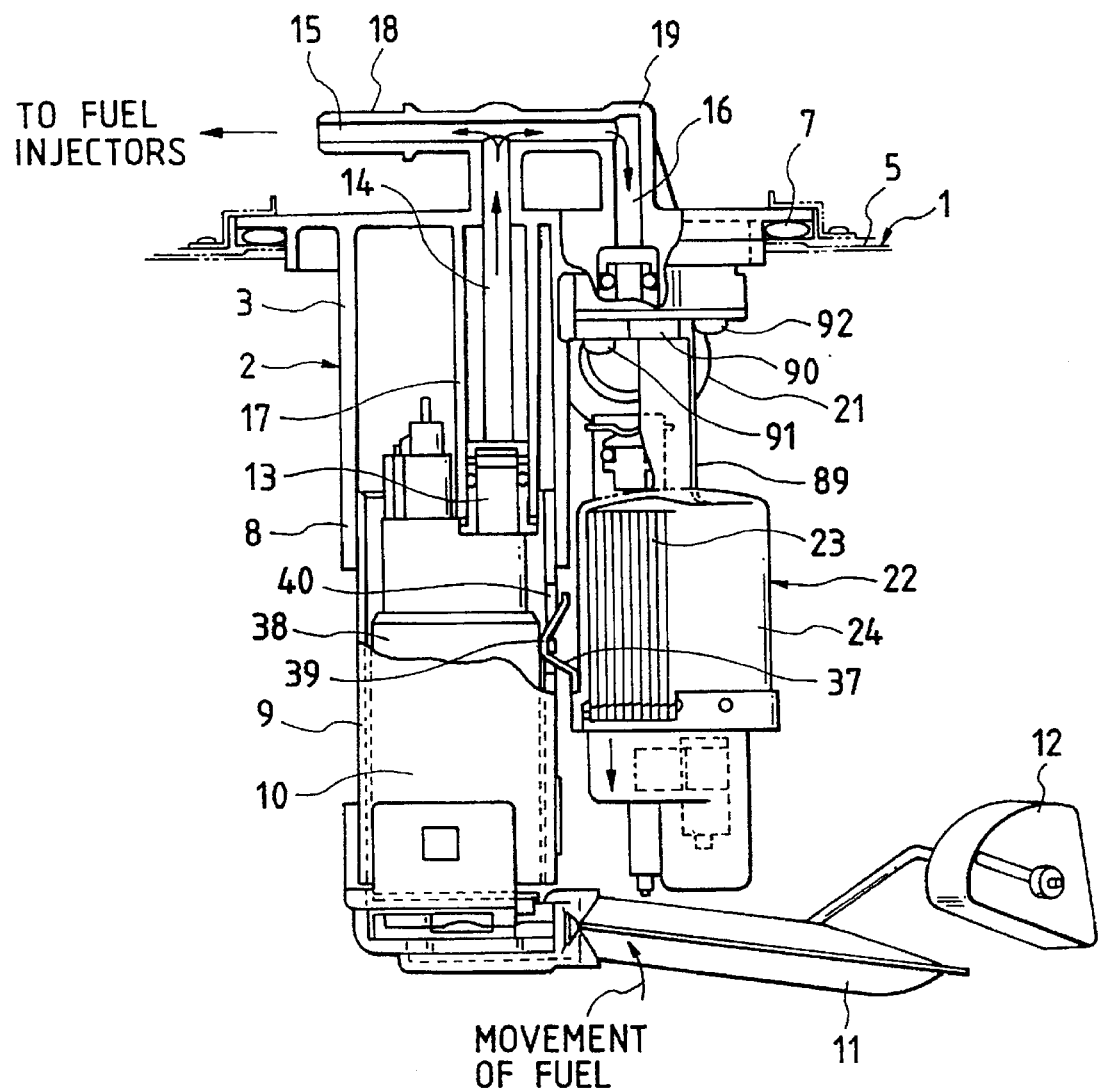
FIG. 7 is a partially cross sectional view which shows a fuel pump apparatus according to the fifth embodiment of the invention.

FIG. 7 shows a fifth embodiment of the fuel pump apparatus which connects the filter casing 24 of the secondary filter 22 directly to a metallic pump housing 38 of the fuel pump 10 through a clamp 37.

The clamp 37 is made of a conductive member which is bent, as shown in the drawing, and is attached to the lower portion of the side wall of the filter casing 24. The clamp 37 may alternatively be integrally formed with the filter casing 24. The pump casing 9 has formed therein a window 40 in alignment with the clamp 37. The claim 37 is inserted into the window so that a bent portion 39 of the clamp 37 elastically engages an outer wall of the pump housing 38 to achieve the electric communication between the filter casing 24 and the pump housing 37.

Thus, the electrostatic charges produced by the friction between the filter element 23 and the fuel flowing through the filter element 23 are discharged from the filter casing 24 to the pump casing 9 through the clamp 27, thereby preventing the resin-made component parts to be damaged.

Next, alternative embodiments having a fuel filter disposed in an inlet line of a pressure regulator in a fuel tank for removing particles from the fuel discharged from a fuel pump will be discussed below with reference to FIGS. 8 to 40.

Figure 13:
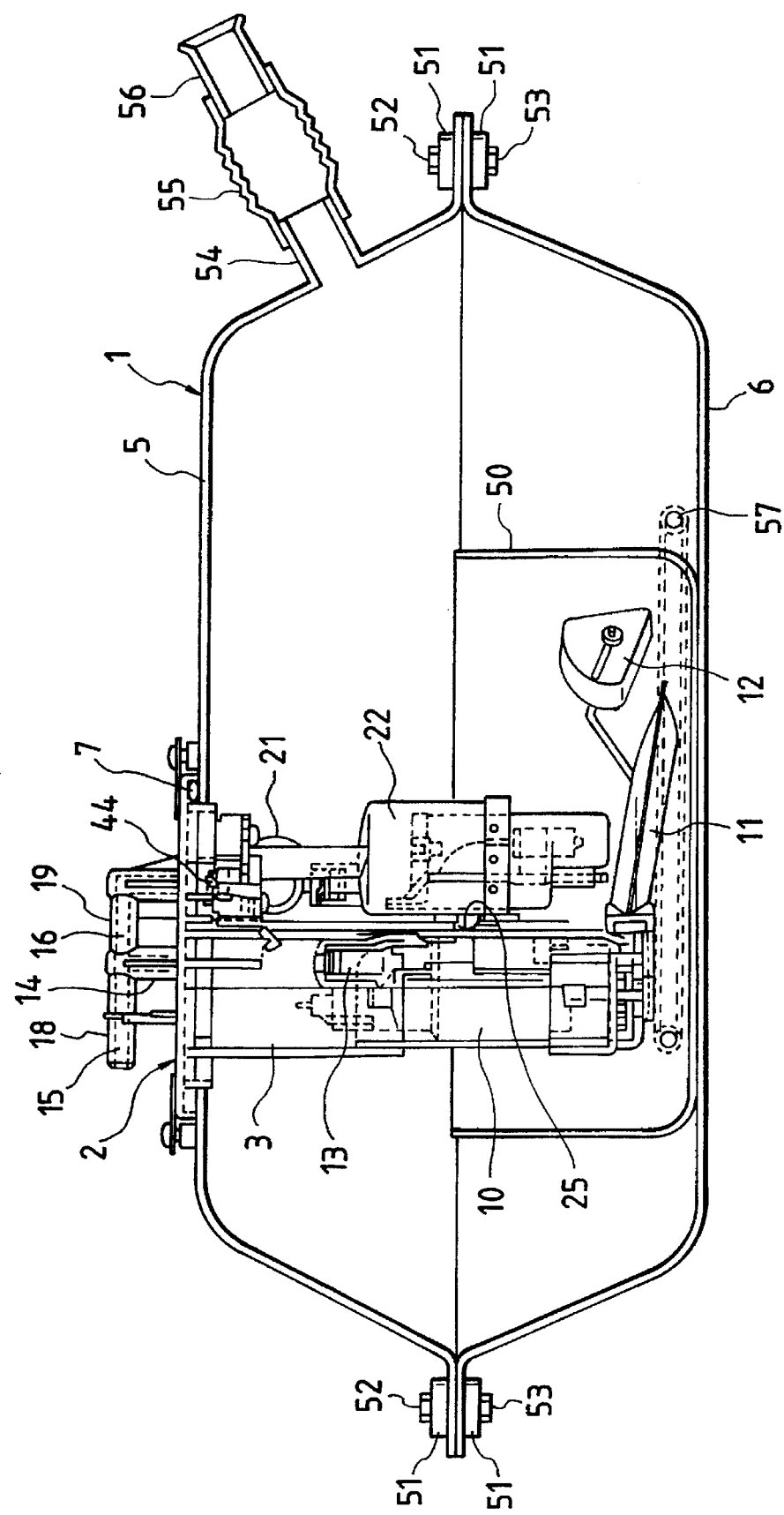
FIG. 13 is a cross sectional view which shows a fuel pump apparatus disposed within a fuel tank.
Figure 14:
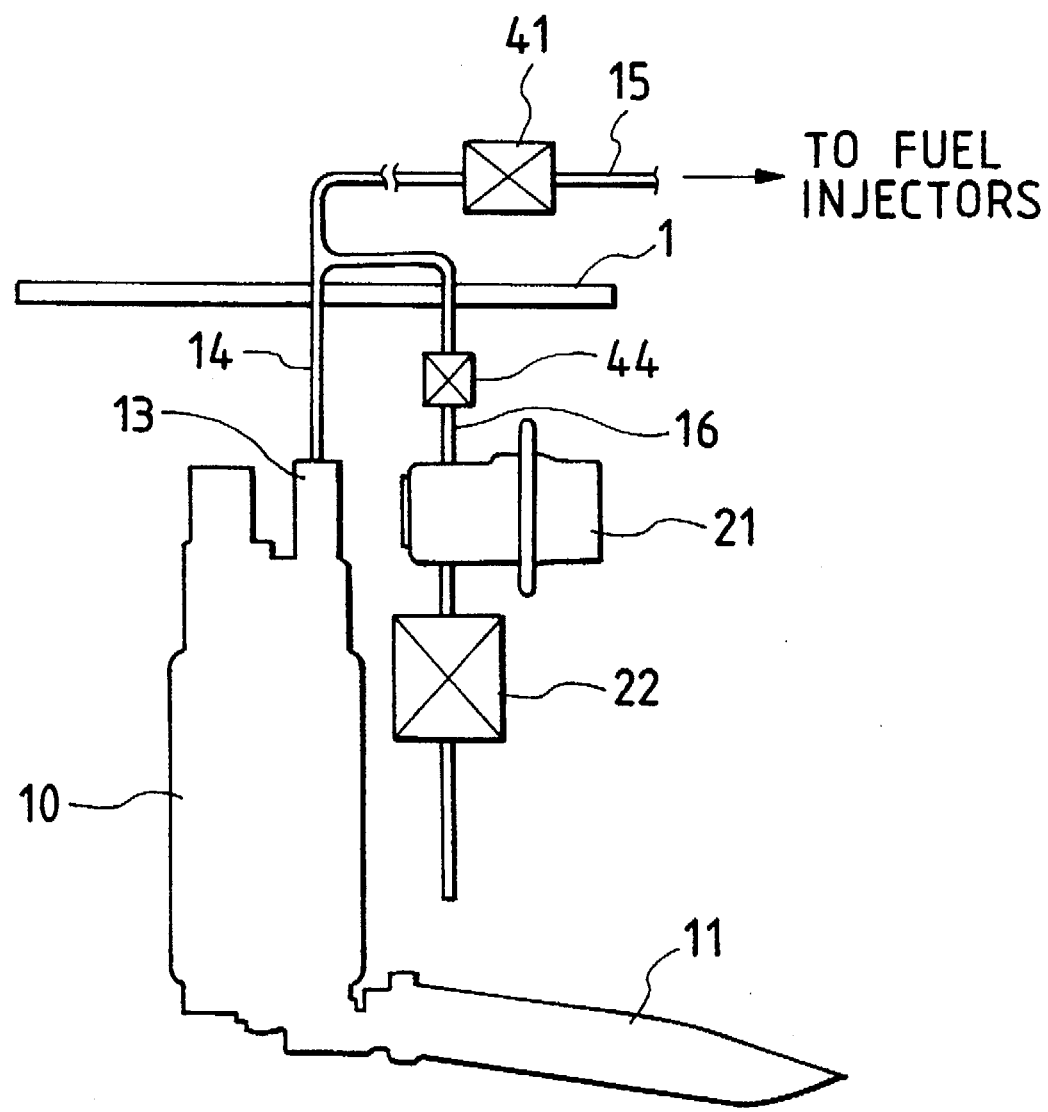
FIG. 14 is an illustration which shows a fuel supply system used with a fuel pump apparatus of the sixth embodiment.
Figure 15:
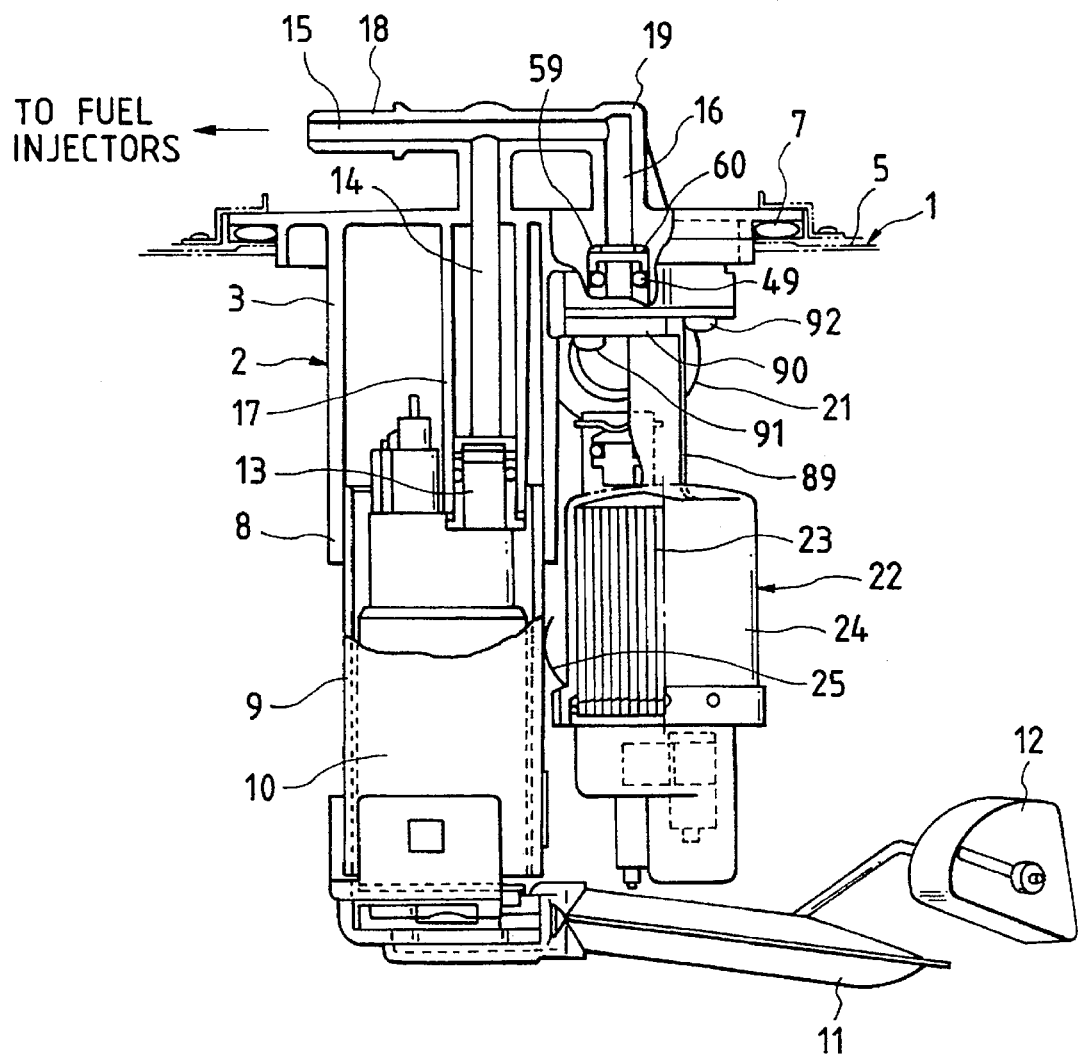
FIG. 15 is a partially cross sectional view which shows a fuel pump apparatus according to the seventh embodiment of the invention.
Figure 16:
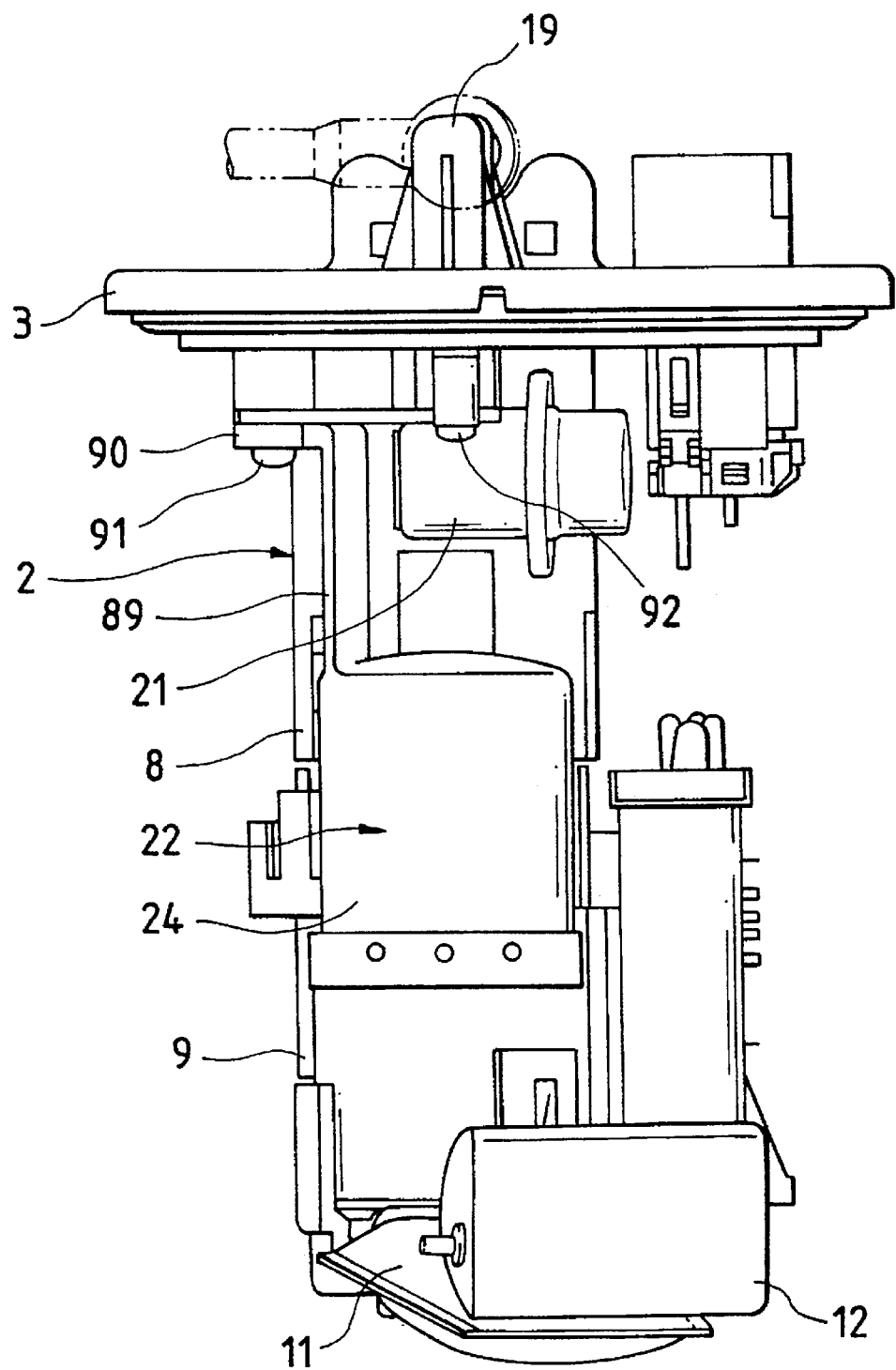
FIG. 16 is a side view of FIG. 15.
Figure 20:
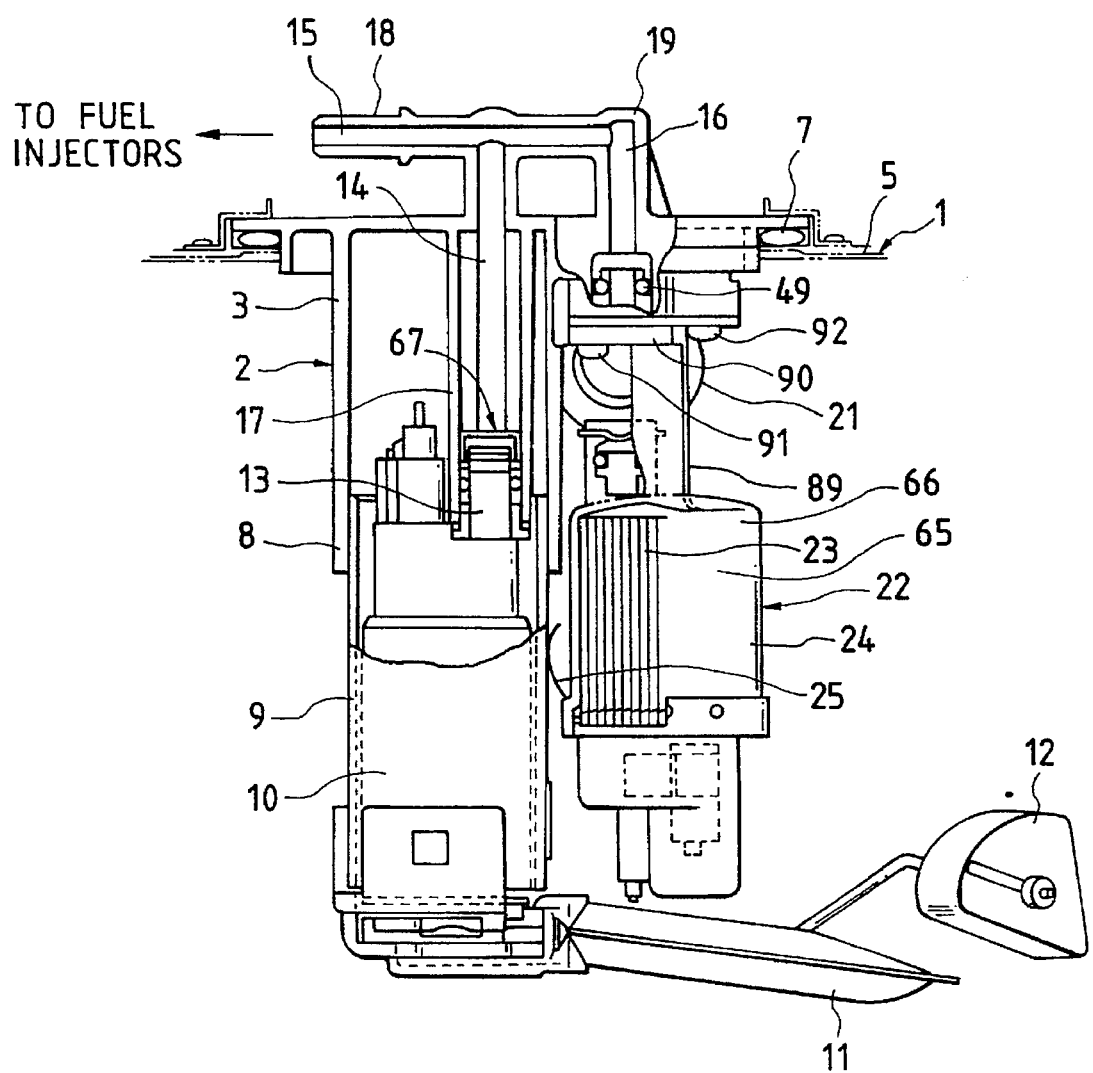
FIG. 20 is a partially cross sectional view which shows a fuel pump apparatus according to the eighth embodiment of the invention.
Figure 21:
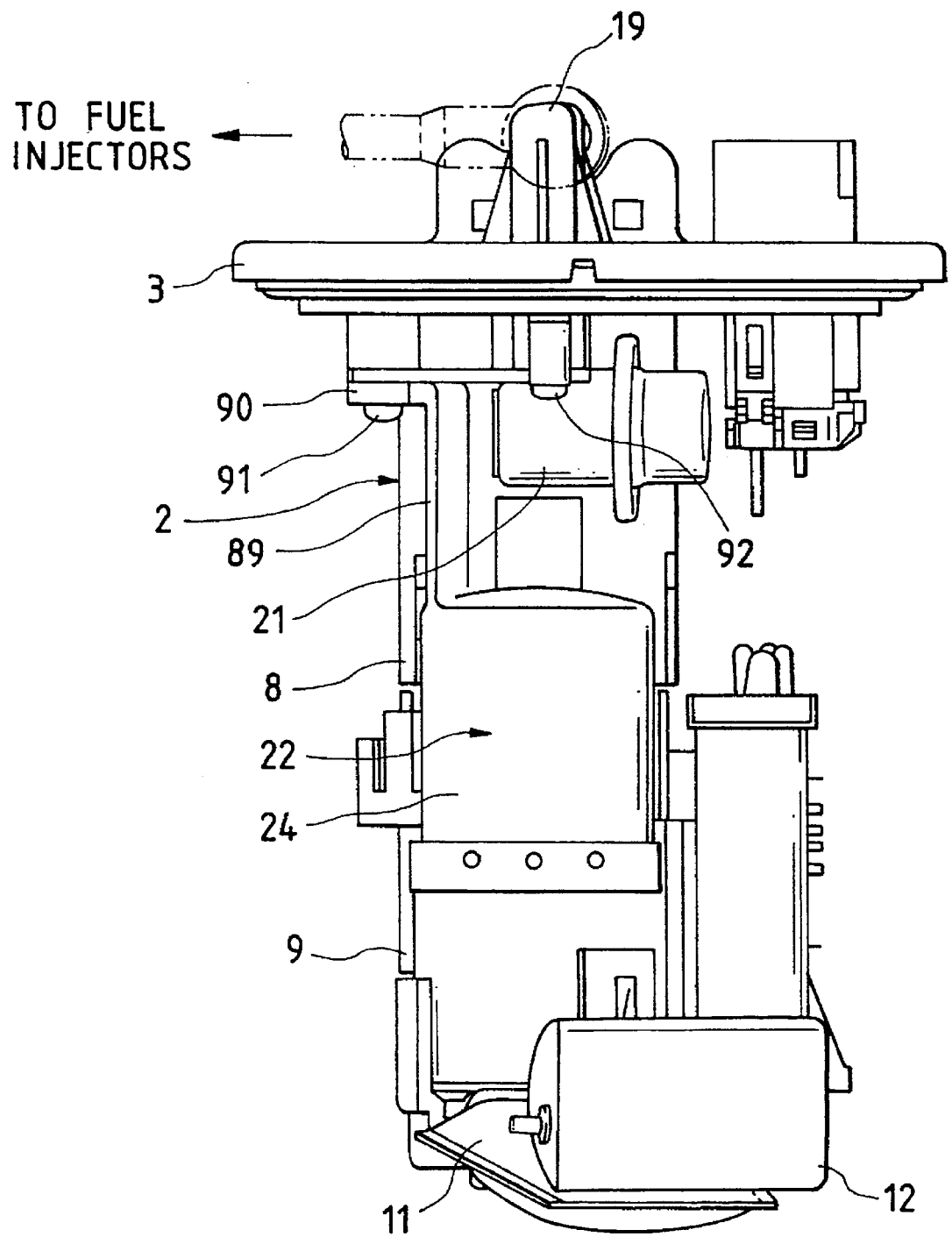
FIG. 21 is a side view of FIG. 20.

FIGS. 8 to 14 show a sixth embodiment of the fuel pump apparatus which is used in a fuel supply system, as shown in FIG. 14. The shown fuel supply system has a third filter 44 functioning as a high-pressure filter and a high-pressure fuel filter 41. The third filter 44 is connected to an inlet port of the pressure regulator 21 arranged in the return passage 16. The fuel filter 41 is disposed at the middle of the fuel supply passage 15 which supplies the fuel to the injectors. The third filter 44 is pressed into the inlet port of the pressure regulator 21. Arrangements thereof in detail are shown in FIGS. 8 to 12.

Figure 8:
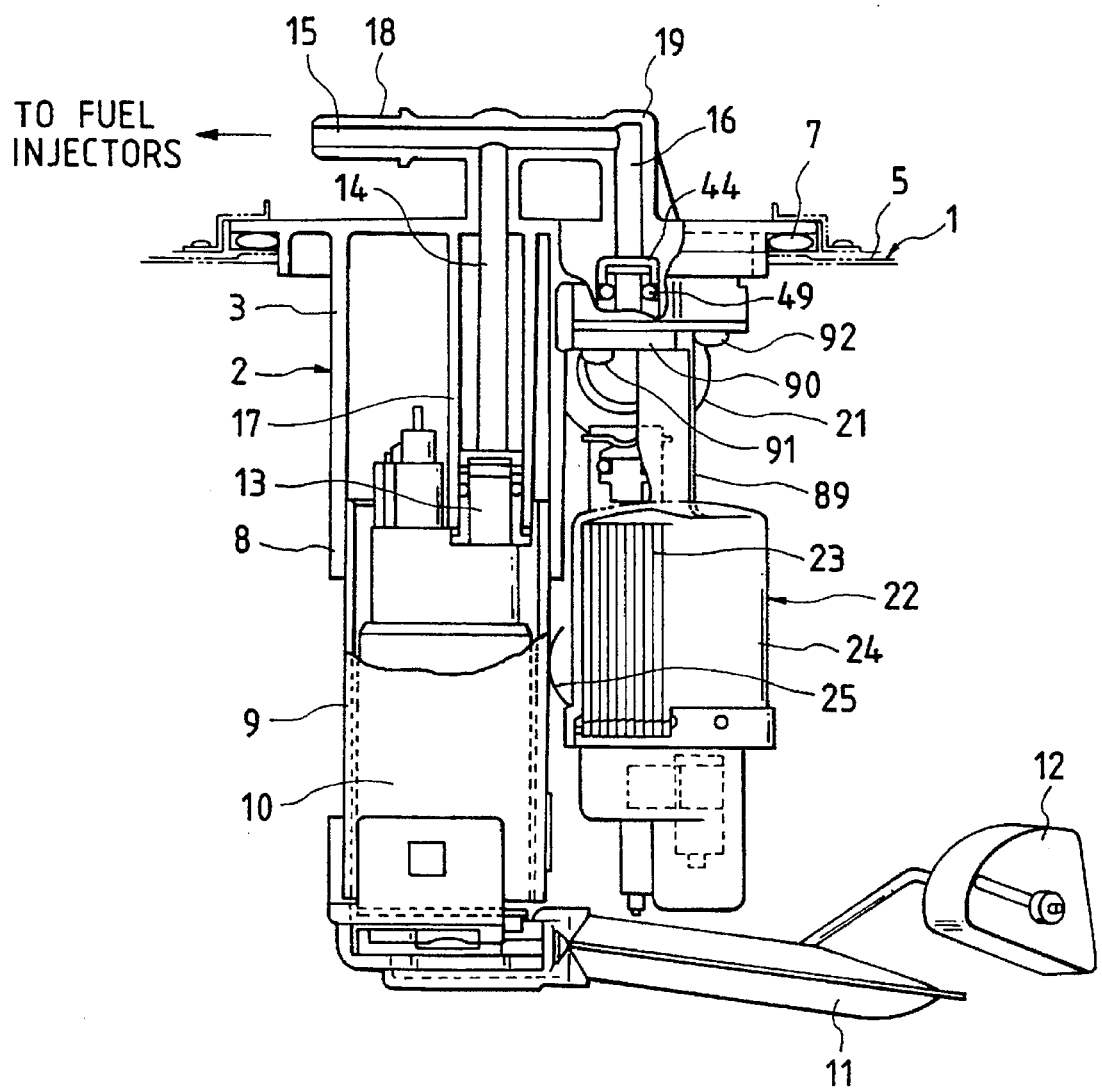
FIG. 8 is a partially cross sectional view which shows a fuel pump apparatus according to the sixth embodiment of the invention.
Figure 9:
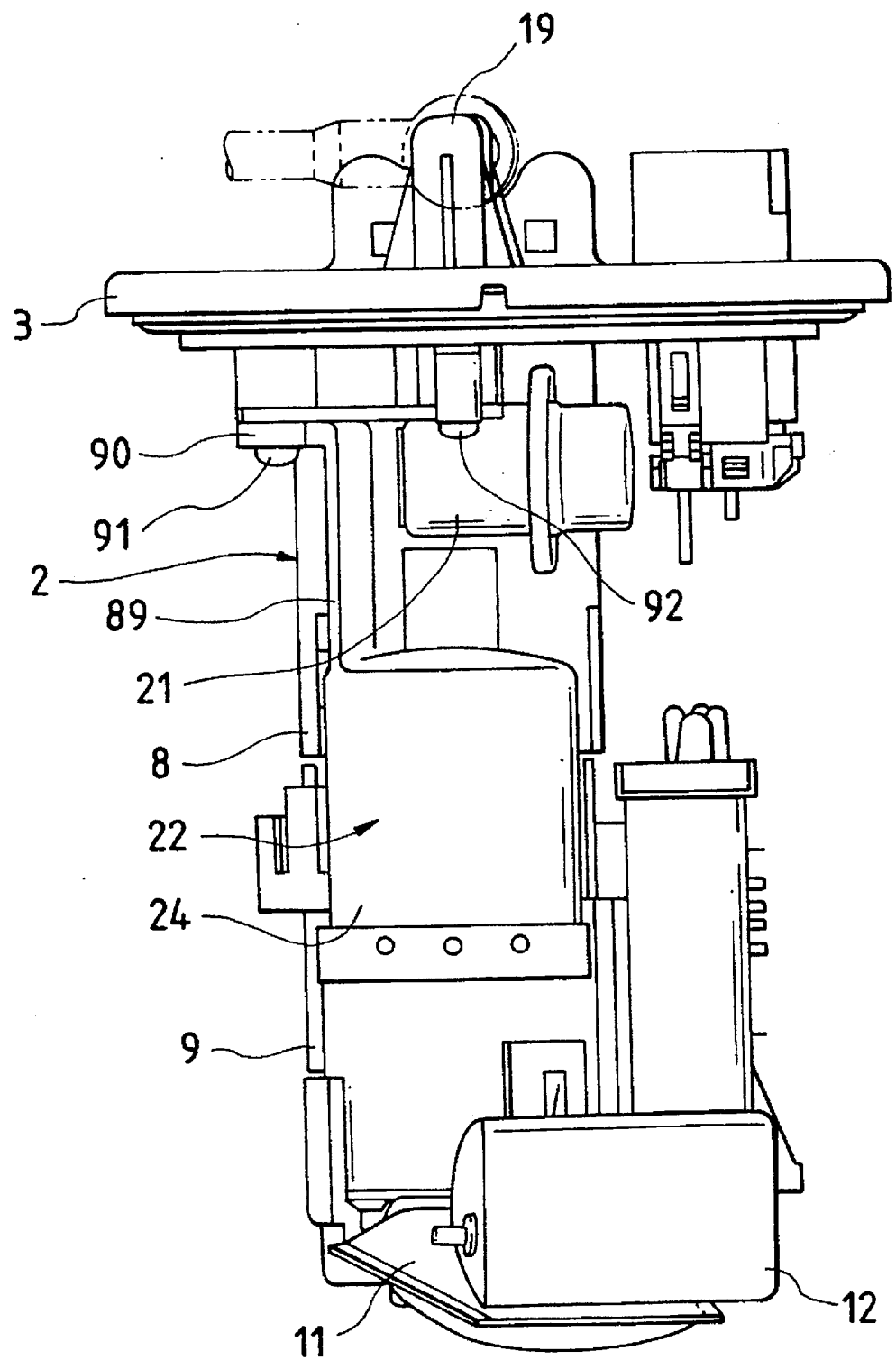
FIG. 9 is a side view of FIG. 8.

The third filter 44 includes, as shown in FIGS. 10(a) and 10(b), a cap-shaped body 45 and a mesh filter element 47. The filter element 47 is disposed in an opening 46 formed in the body 45 and welded or bonded to the body 45. The pressure regulator 21, as shown in FIG. 11, holds fuel pressure in an inlet port 43 leading to the fuel return passage 16 at a given pressure level. An outlet port 48 is, as shown in FIG. 8, connected to the inlet port of the secondary filter 22. The inlet port 43 of the pressure regulator 21 is, as shown in FIG. 8, connected to a portion of the flange 3 communicating with the fuel return passage 16. The fuel return passage 16 is sealed with an O-ring 49.

The resin-made flange 3 defines therein an inverted U-shaped fuel line extending from the fuel passage 14 to the fuel return passage 16 through the fuel supply passage 15 within a range from the outlet port 13 of the fuel pump 10 to the inlet port 43 of the pressure regulator 21. The fuel discharged from the outlet port 13 of the fuel pump 10 is distributed to the fuel supply passage 15 of the main tube 18 and the fuel return passage 16 of the return tube 19. The part of the fuel delivered to the fuel supply passage 15 is supplied to the fuel injectors of the engine by a desired consumption, while the remainder thereof delivered to the fuel return passage 19 is regulated in pressure by the pressure regulator 21 to the given pressure level and then returned to the sub-tank 50 in the fuel tank 1 through the secondary filter 22 disposed downstream of the pressure regulator 21.

According to the sixth embodiment, the use of the third filter 44 connected to the inlet port 43 of the pressure regulator 21 prevents foreign substances from entering the pressure regulator 21, thereby avoiding wear and breakage of internal parts of the pressure regulator 21. Particularly, resin particles such as burrs or flashes produced during the formation of the fuel supply passage 15 within the flange 3 are removed by the third filter 44. This prevents any foreign substances from entering the pressure regulator 21 completely.

The third filter 44 is designed to be detachable from the inlet port 43 of the pressure regulator 21 for ease of replacement or cleaning thereof.

The mesh size of the filter element 47 is smaller than or equal to that of the primary filter 11. This is because the third filter 44 is provided for preventing foreign substances existing from the outlet port 13 of the fuel pump 10 to the inlet port 43 of the pressure regulator 21 from entering the pressure regulator 21. The decreasing the mesh size of the filter element 47 of the third filter 44 causes the filter element 47 to be blocked early, requiring frequent replacement of the filter 44. The use of the third filter 44 which is blocked causes the fuel pressure in the fuel line to be elevated undesirably to increase the amount of fuel to be supplied to the injectors, resulting in a shift of an air-fuel ratio to the rich side.

The third filter 44 is located adjacent the inlet port 43 of the pressure regulator 21, thereby removing foreign substances entering the pressure regulator 21 effectively. Additionally, this arrangement eliminates the possibility of a connection between the O-ring 49 of the pressure regulator 21 and the fuel return passage 16 being damaged.

The fuel pump apparatus, as indicated by numeral 2 in FIG. 13, is disposed within the fuel tank 1. The metallic upper thank 5 and lower tank 6 are combined together by insulators 51, bolts 52, and nuts 53. To a rider opening 54 in the upper tank 5, a supply pipe 56 is connected through a rubber boot 55. Within the lower tank 6, a sub-tank 50 is disposed which is connected to the outside through a pipe 57.

Disposed within the sub-tank 50 are the primary filter 11, the pump casing 9, the pressure regulator 21, and the secondary filter 22. The pressure regulator 21 is, as discussed above, designed to regulate the pressure in a pressure chamber defined therein using a non-conductive diaphragm and a spring. The flange 3 retaining the pressure regulator 21 and the secondary filter 22 is mounted on the upper tank 5. The fuel pumped out by the fuel pump 10 through the primary filter 11 is discharged from the outlet port 13 and part thereof is supplied to the injectors of the engine through the fuel supply passage 15 in the main tube 18, while the remainder thereof is supplied to the pressure regulator 21 through the third filter 44 in the fuel return passage 16 of the return tube 19 and then modified in pressure to the given pressure level. The fuel discharged from the pressure regulator 21 passes through the secondary filter 22 and then is returned to the fuel tank 1.

FIGS. 15 to 19 show a seventh embodiment of the fuel pump apparatus.

A fuel filter 60 is, as shown in FIG. 18, disposed in a faucet portion 59 communicating with the fuel return passage 16 of the return tube 19 formed in the flange 3. The fuel filter 60 includes, as shown in FIGS. 17(a) and 17(b), a body 61 and a filter element 62 made of a mesh screen installed in a central opening 63 of the body 61. The filter element 62 is welded or bonded to the body 61.

The fuel filter 60 is pressed into the faucet portion 59 which is a connecting portion with the pressure regulator 21. In other words, the fuel filter 60 is disposed adjacent the inlet port of the pressure regulator 21, thereby removing foreign substances entering the pressure regulator 21 with high efficiency.

FIGS. 20 to 25 show an eighth embodiment of the fuel pump apparatus.

Figure 22A:
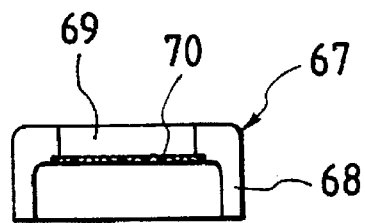
FIG. 22(a) is a cross sectional view which shows a fuel filter.
Figure 22B:
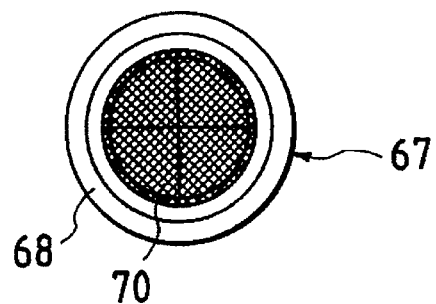
FIG. 22(b) is a plan view of FIG. 22(a)
Figure 23:
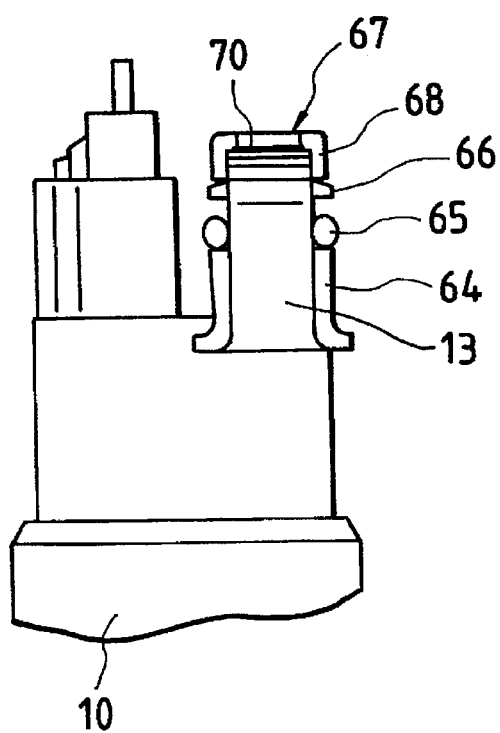
FIG. 23 is an illustration which shows a fuel filter mounted on a cap fitted on an outlet port of a fuel pump.
Figure 24:
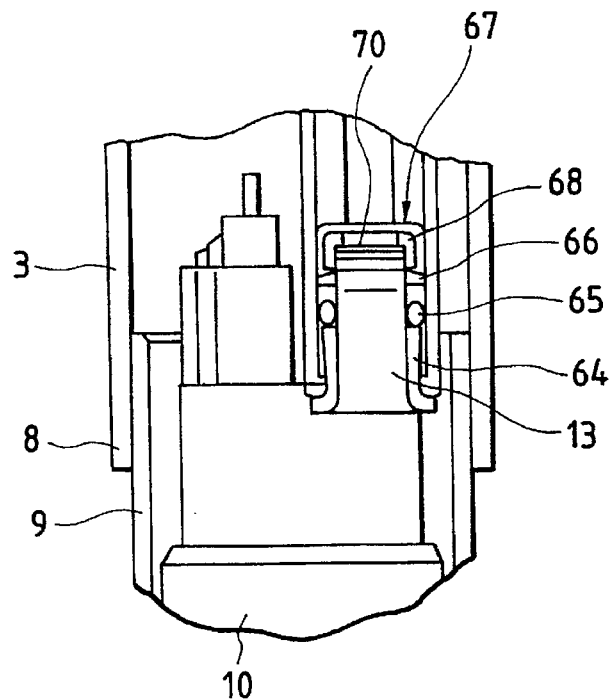
FIG. 24 is a partially cross sectional view which shows an outlet port of a fuel pump mounted in a fuel passage.
Figure 25:
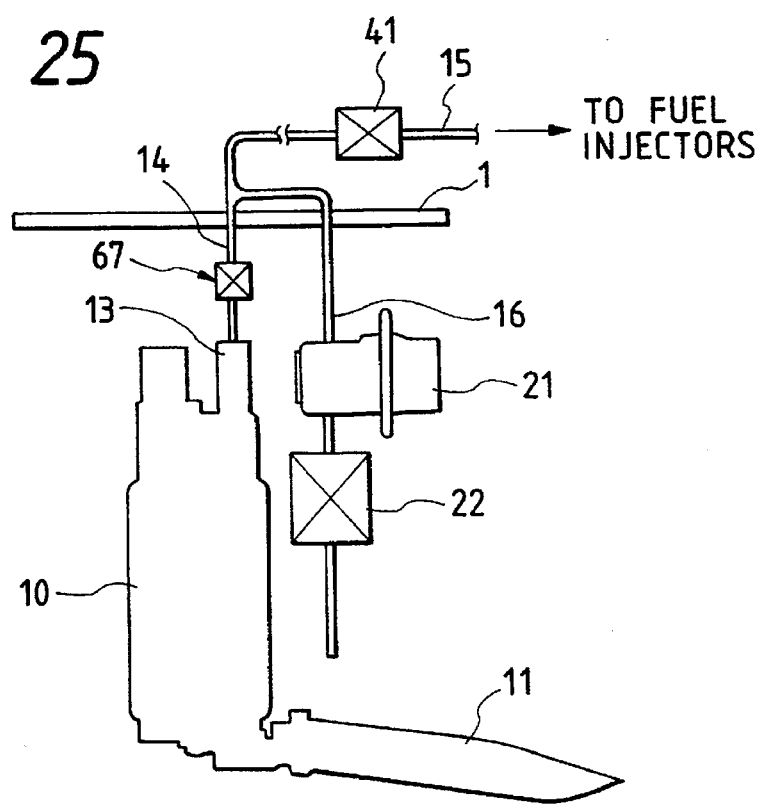
FIG. 25 is an illustration which shows a fuel supply system used with a fuel pump apparatus of the eighth embodiment.

As shown in FIG. 23, a spacer 64, an O-ring 65, and a cap 66 engage the periphery of the outlet port 13 of the fuel pump 10. A fuel filter 67 is tightly fitted on the end of the outlet port 13. The fuel filter 67 includes, as shown in FIGS. 22(a) and 22(b), a body 68 and a filter element 79 made of a ring-shaped screen installed in a central opening 69 of the body 68. The filter element 70 is welded or bonded to the body 68. A fuel supply system with which this embodiment is used is shown in FIG. 25.

According to the eighth embodiment, the press-fitting of the fuel filter 67 on the cap 66 installed on the outlet port 13 of the fuel pump 10 allows the fuel filter 67 to be replaced only by removing the fuel pump 10 without removing the secondary filter 22.

FIGS. 26 to 30 show a ninth embodiment of the fuel pump apparatus wherein a cap installed on the end of the outlet port 13 of the fuel pump 10 has a fuel filtering function.

Figure 26:
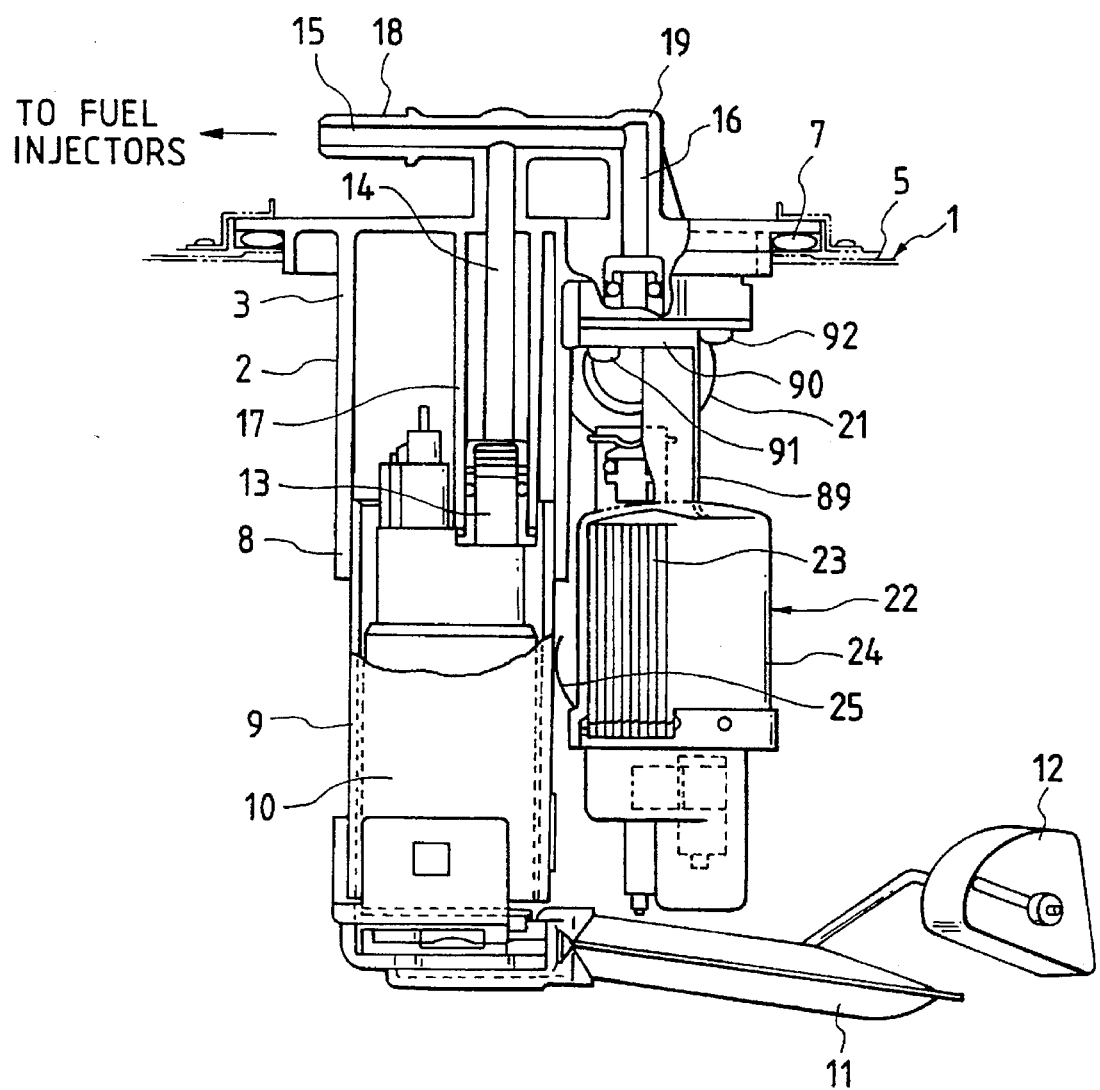
FIG. 26 is a partially cross sectional view which shows a fuel pump apparatus according to the ninth embodiment of the invention.
Figure 27:
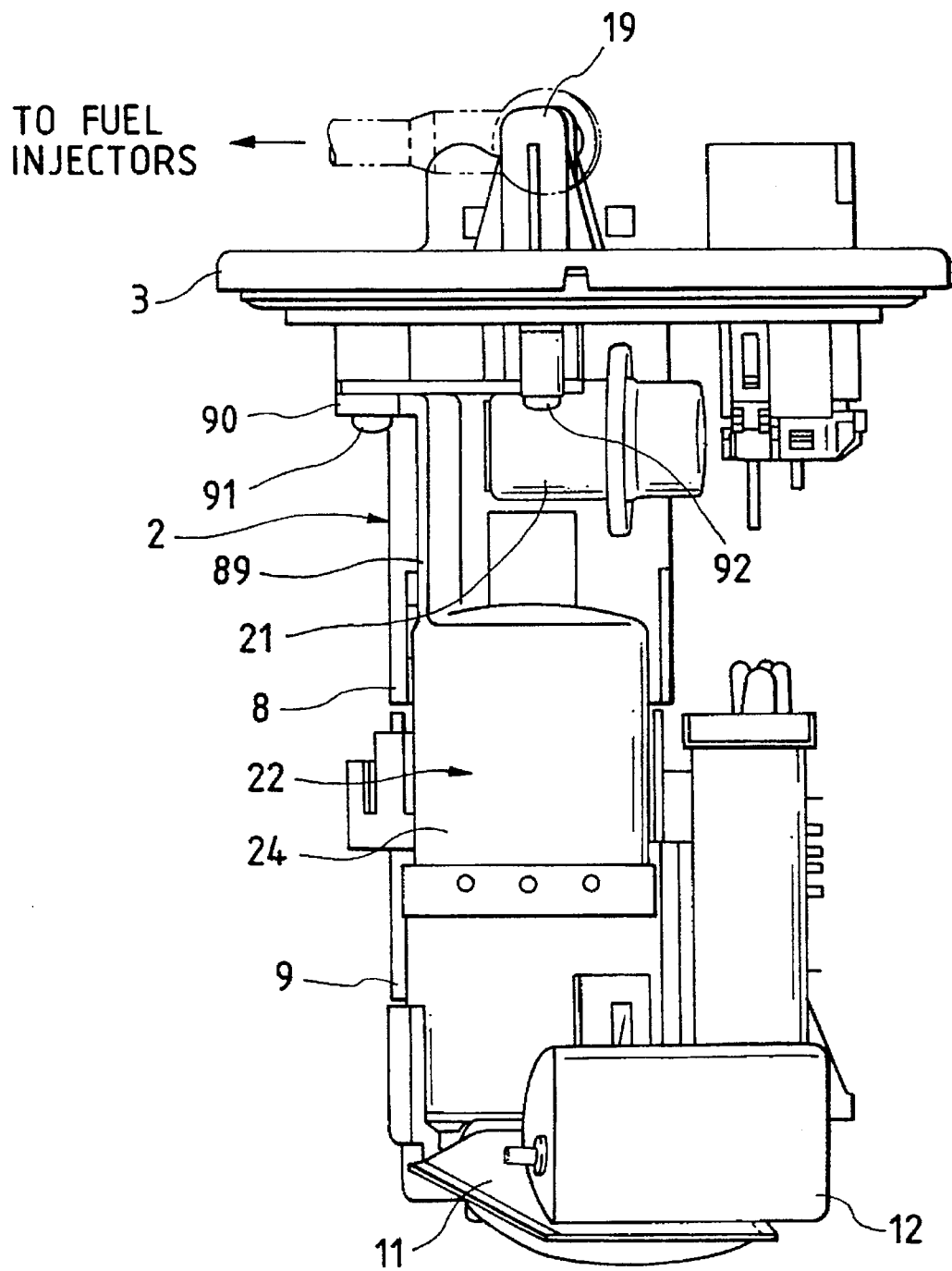
FIG. 27 is a side view of FIG. 26.
Figure 28A:
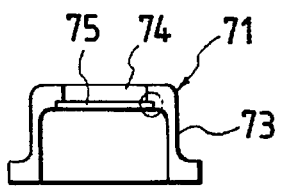
FIG. 28(a) is a cross sectional view which shows a fuel filter.
Figure 28B:
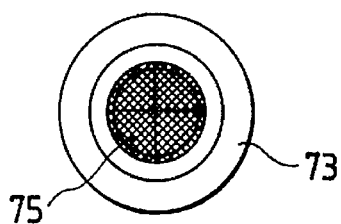
FIG. 28(b) is a plan view of FIG. 28(a)
Figure 29:
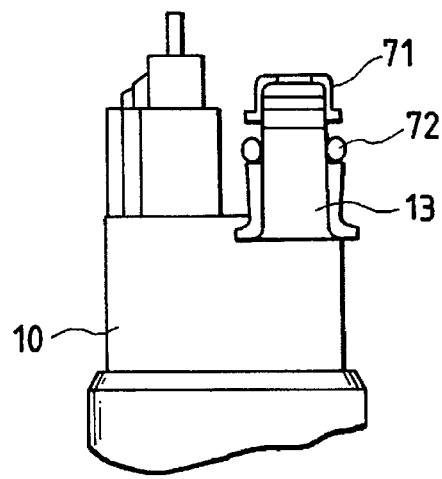
FIG. 29 is an illustration which shows a fuel filter mounted on an outlet port of a fuel pump.
Figure 30:
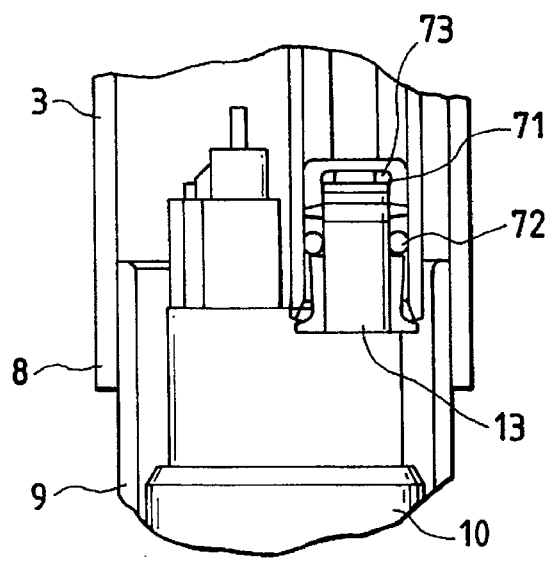
FIG. 30 is a partially cross sectional view which shows an outlet port of a fuel pump mounted in a fuel passage.
Figure 31:
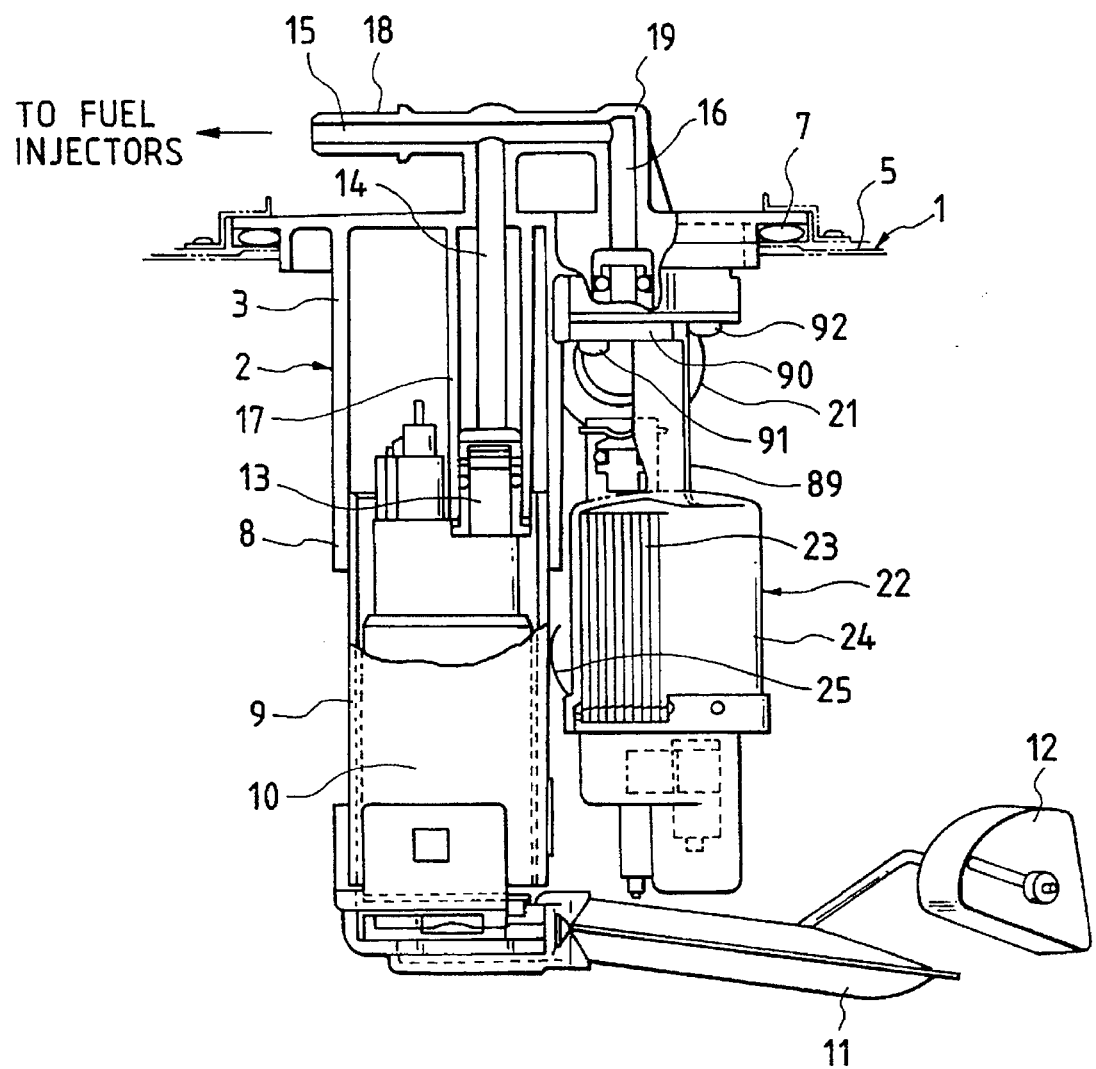
FIG. 31 is a partially cross sectional view which shows a fuel pump apparatus according to the tenth embodiment of the invention.
Figure 32:
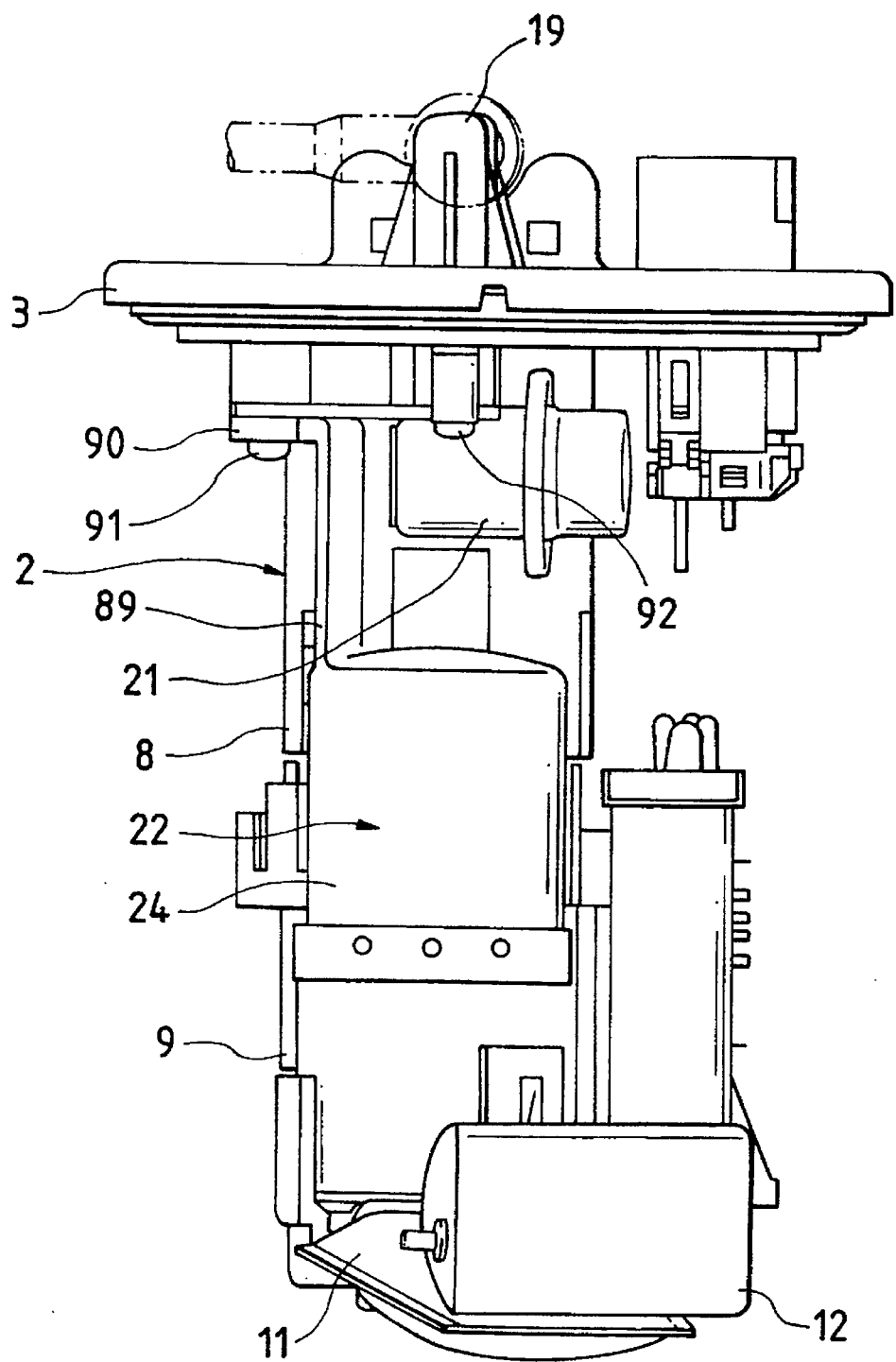
FIG. 32 is a side view of FIG. 31.

A fuel filter 71 is, as shown in FIG. 29, tightly fitted on the end of the outlet port 13 of the fuel pump 10. The fuel filter 71, as shown in FIGS. 28(a) and 28(b), includes a cap-shaped body 73 and a filter element 75 made of a screen installed in a central opening 74 formed in the body 73. The filter element 75 is welded or bonded to the body 73. The fuel filter 71 is, as discussed above, fitted on the end of the outlet port 13 and, as can be seen in FIG. 26, communicates with an inlet of the fuel passage 14 formed in the flange 3.

According to the ninth embodiment, the press-fitting of the fuel filter 71 on the end of the outlet port 13 of the fuel pump 10 allows the fuel filter 71 to be replaced only by removing the fuel pump 10 without removing the pressure regulator 21 and the secondary filter 22 arranged downstream of the pressure regulator 21. Additionally, no damage is caused to a connecting portion of the outlet port 13 to the fuel filter 71 upon removal thereof.

FIGS. 31 to 35 show a tenth embodiment of the fuel pump apparatus which includes a fuel filter pressed into a connection between the outlet port 13 of the fuel pump 10 and the cylinder 17.

Figure 33A:
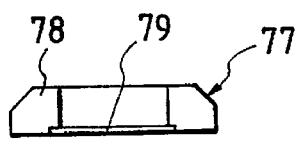
FIG. 33(a) is a cross sectional view which shows a fuel filter.
Figure 33B:
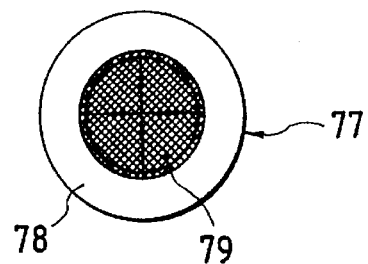
FIG. 33(b) is a plan view of FIG. 33(a)
Figure 34:
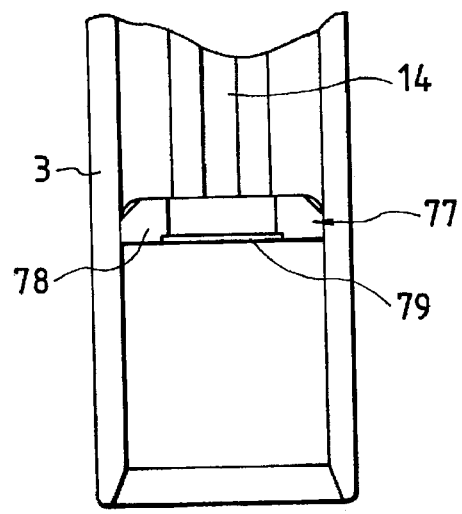
FIG. 34 is an illustration which shows a fuel filter disposed within a fuel passage.
Figure 35:
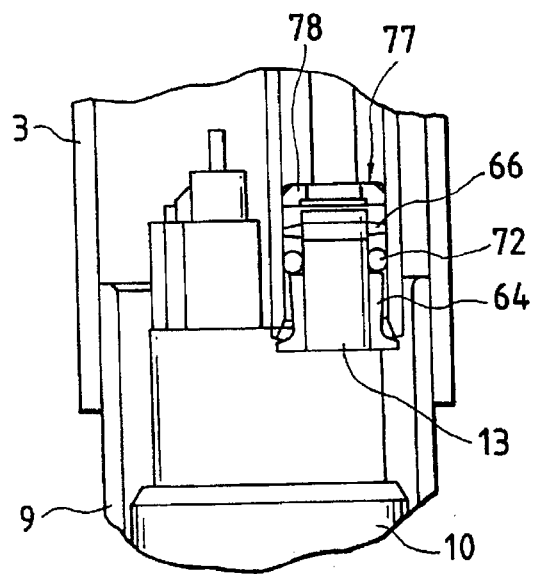
FIG. 35 is a partially cross sectional view which shows an outlet port of a fuel pump mounted in a fuel passage.

A fuel filter 77 is, as can be seen in FIG. 34, pressed into the lower end portion of the cylinder 17 (i.e., the fuel passage 14) of the flange 3 into which the outlet port 13 of the fuel pump 10 is inserted. The fuel filter 77 includes, as shown in FIGS. 33(a) and 33(b), an annular body 78 and a filter element 79 made of a screen. The filter element 79 is fitted into a central opening formed in the body 78 and welded or bonded to the body 78. The fuel filter 77 is, as shown in FIG. 35, disposed above the outlet port 13 of the fuel pump 10.

The fuel discharged from the outlet port 13 of the fuel pump 10 passes through the fuel filter 77 so that foreign particles contained in the fuel are removed. This prevents the pressure regulator 21 to be worn or damaged by the foreign particles contained in the fuel.

FIGS. 36 to 39 show an eleventh embodiment of the fuel pump apparatus which uses a fuel pump of a type different from that used in the above tenth embodiment.

Figure 36:
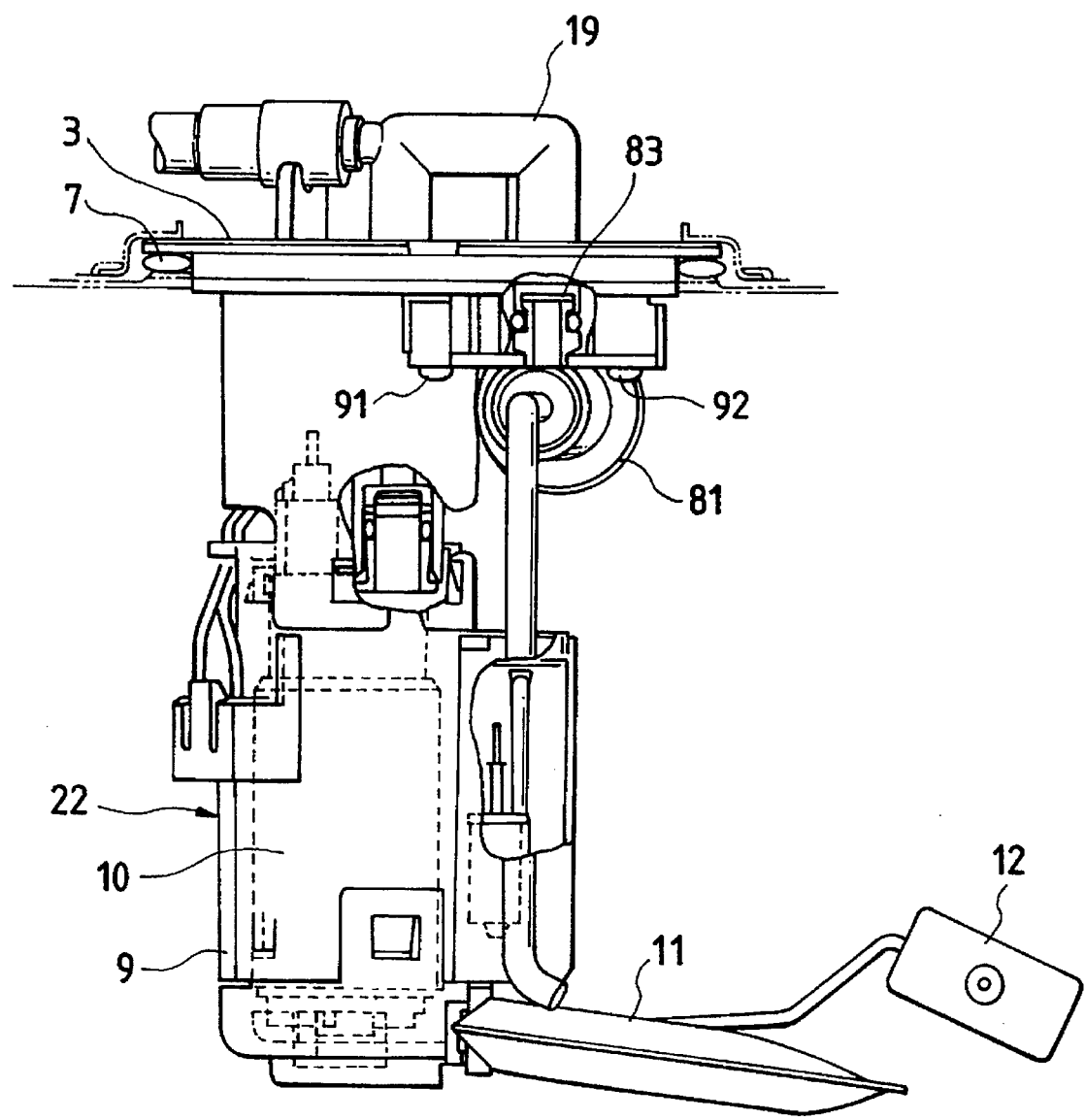
FIG. 36 is a partially cross sectional view which shows a fuel pump apparatus according to the eleventh embodiment of the invention.
Figure 37:
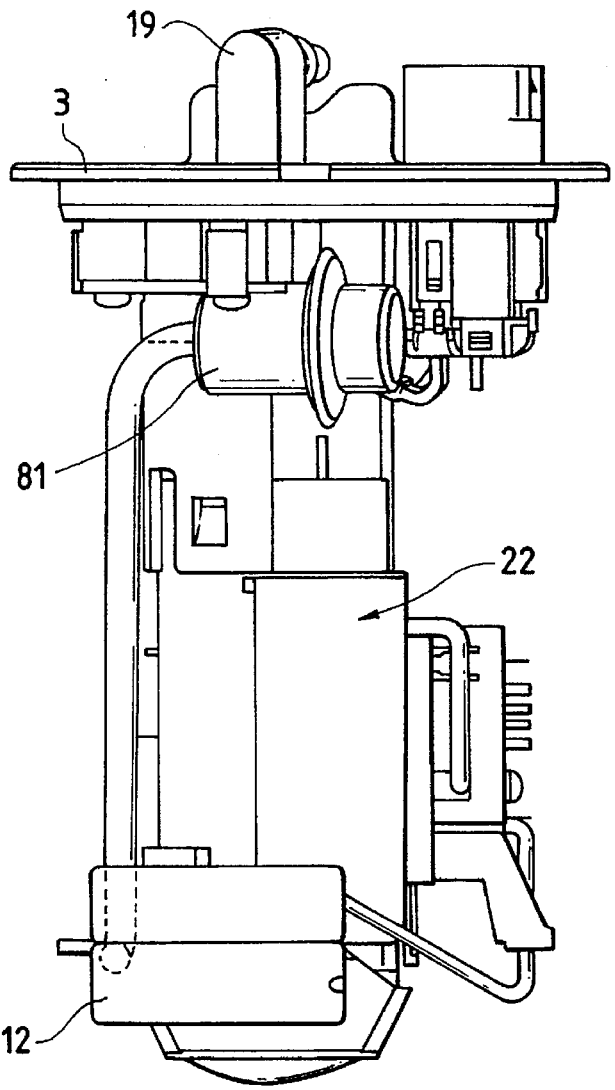
FIG. 37 is a side view of FIG. 36.
Figure 38:
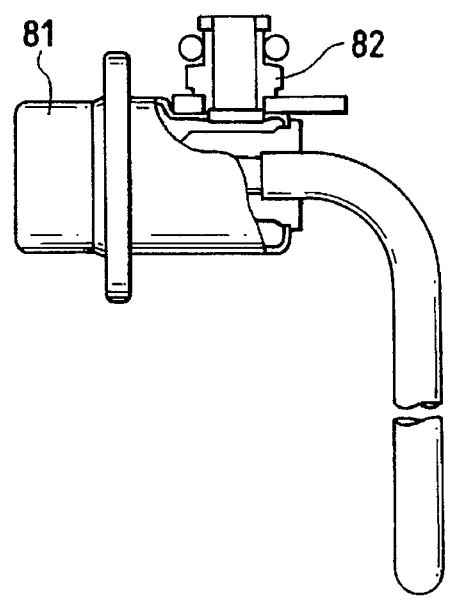
FIG. 38 is a partially cross sectional view which shows a pressure regulator of the eleventh embodiment.
Figure 39:
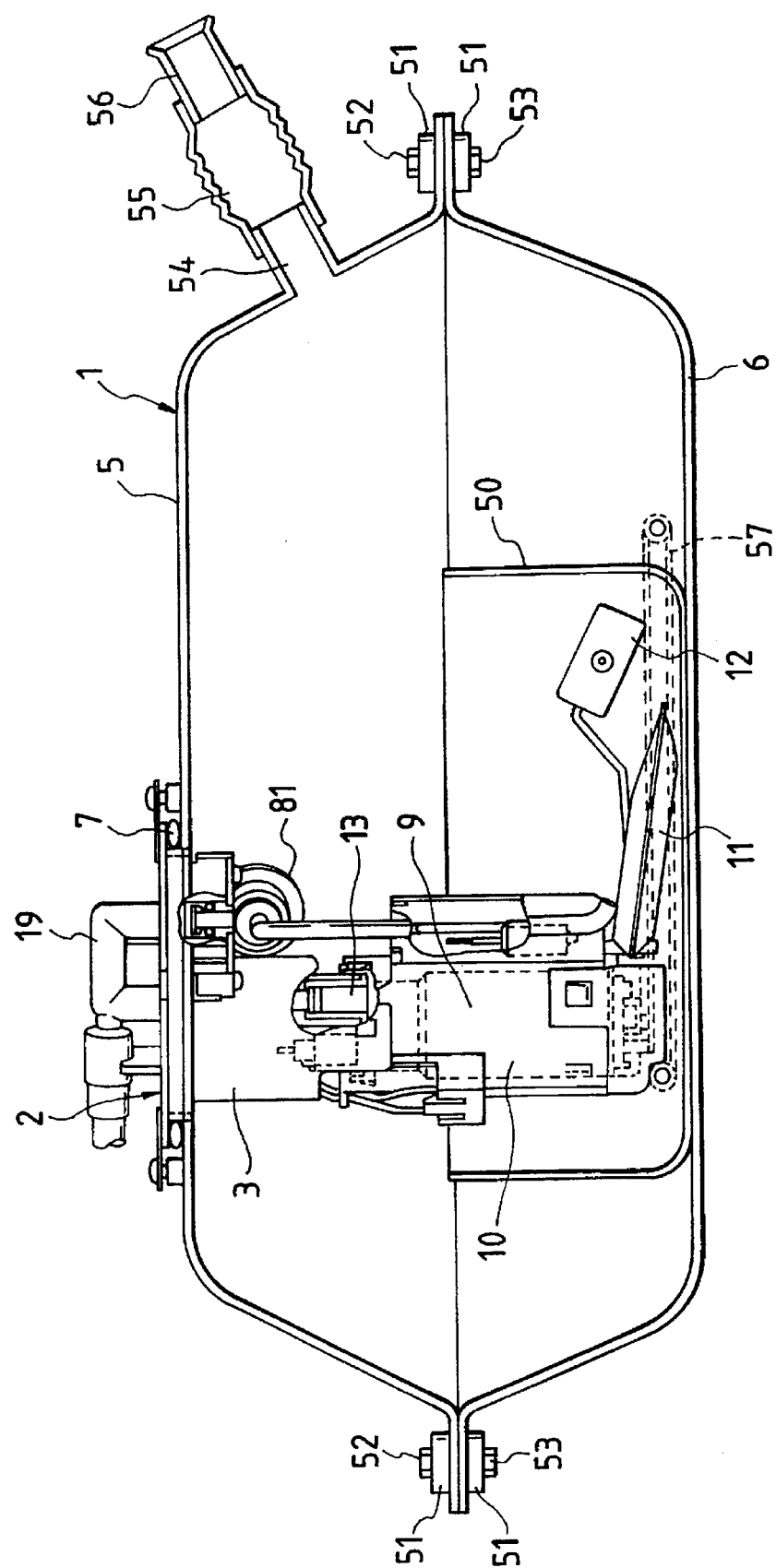
FIG. 39 is a cross sectional view which shows a fuel pump apparatus of the eleventh embodiment disposed within a fuel tank.

A fuel filter 83, as shown in FIG. 36, is pressed into the return tube 19 adjacent to the outlet port 82, as shown in FIG. 38, of the pressure regulator 81. The fuel filter 83 has the same function as that of the third filter 44 shown in FIG. 11. Other arrangements are identical with those of the sixth embodiment, and explanation thereof in detail will be omitted here.

Figure 40:
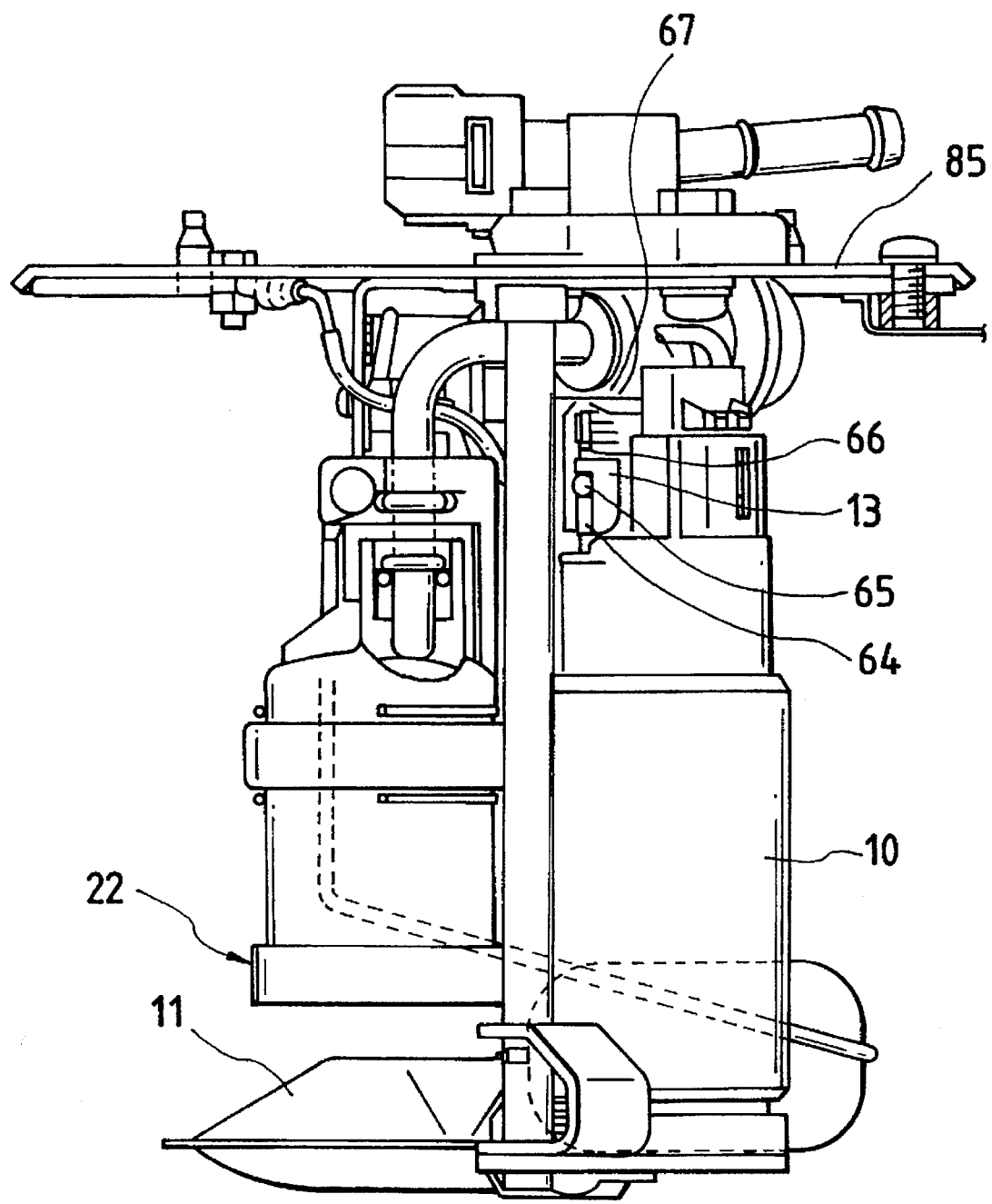
FIG. 40 is a perspective view which shows a fuel pump apparatus according to the twelfth embodiment.

FIG. 40 shows a twelfth embodiment of the fuel pump apparatus.

The fuel pump 10 is suspended from a metallic bracket 85. A spacer 64, an O-ring 65, and a cap 66 engage the outlet port 13 of the fuel pump 10. A fuel filter 67 is disposed on the cap 66. The same reference numbers as employed in the above embodiments indicate the same parts, and explanation thereof in detail will be omitted here.

FIGS. 41 to 44 show a thirteenth embodiment of the fuel pump apparatus which is used in a saddle-shaped fuel tank usually employed in four-wheel drive vehicles.

Figure 43:
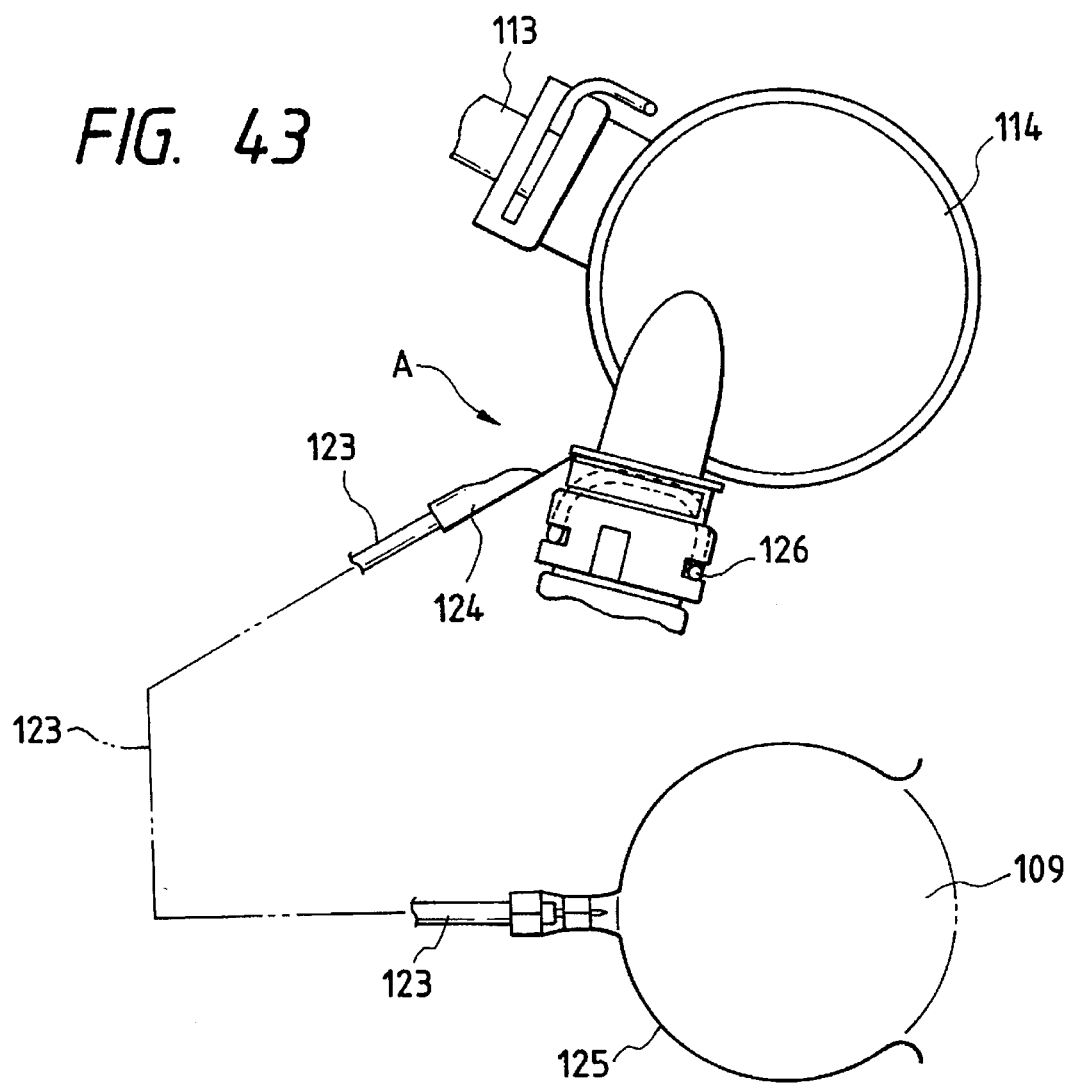
FIG. 43 is an illustration which shows an arrangement of a lead connecting between a fuel pump and a return filter.

Metallic portions of a fuel tank 101 and a fuel supply pipe 112 are electrically connected to the vehicle body. Metallic portions such as a housing of a pressure regulator 81 and a bracket 106 are at the same potential as that of the vehicle body through a metallic cover 111. A pump housing 109 and a filter casing 122 of a return filter 114 are electrically insulated from the vehicle body and electrically connected to each other through a conductive wire or lead 123. The lead 123 is, as shown in FIG. 43, connected at one end to a terminal 124 which is attached to an outlet pipe of the return filter 114 through a retainer 126 to establish electric communication therebetween. The other end of the lead 123 is connected to a terminal 125 having a C-shaped portion elastically engaging the periphery of the pump housing 109 to achieve electric communication between the lead 123 and the pump housing 109.

Figure 41:
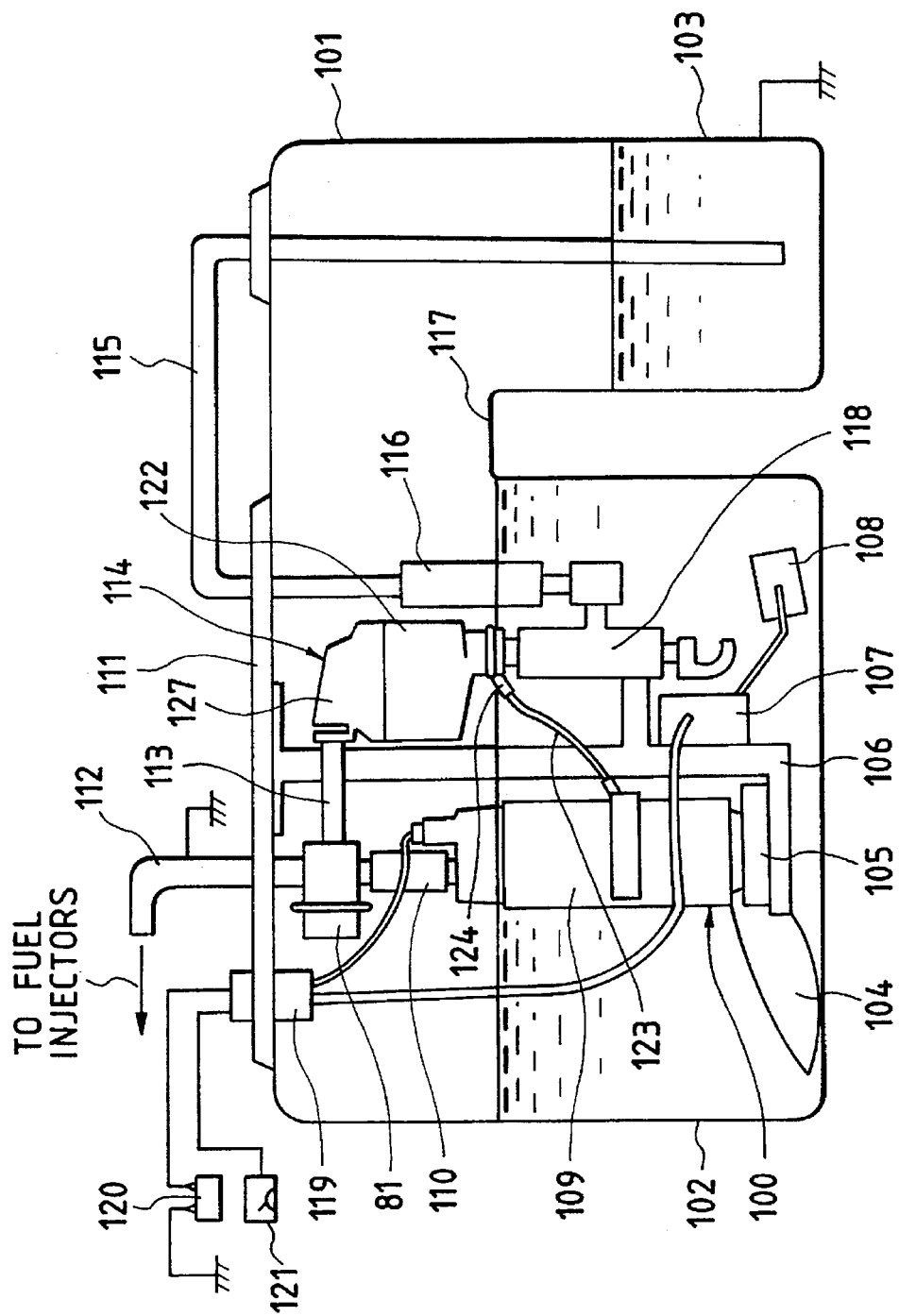
FIG. 41 is a partially cross sectional view which shows a fuel pump apparatus according to the thirteenth embodiment disposed within a fuel tank.
Figure 42:
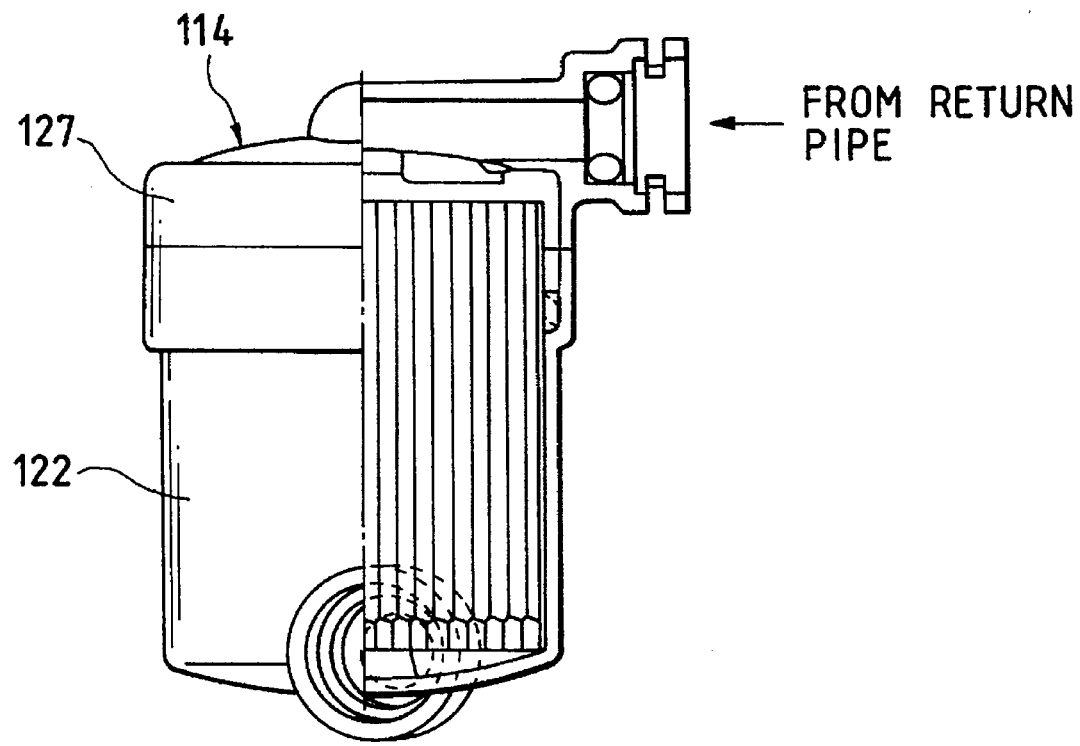
FIG. 42 is a partially cross sectional view which shows a return filter used in the thirteenth embodiment.
Figure 44:
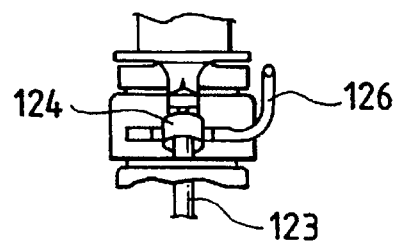
FIG. 44 is an illustration as viewed from an arrow A in FIG. 43.

The fuel tank 101, as shown in FIG. 41, is divided by a separator 117 into a main tank 102 and a sub-tank 103 which are arranged in parallel to the longitudinal center line of the vehicle body. Within the main tank 102, a fuel pump 100 is mounted on a base of the bracket 106 through a rubber cushion 105. The bracket 106 is made of a metallic member and is suspended from the metallic cover 111 disposed on an upper portion of the main tank 102. An inlet filter 104 is connected to an inlet port of the fuel pump 100. To an outlet port of the fuel pump 100, the pressure regulator 81 is connected through a rubber pipe 110. A supply pipe 112 is connected to an outlet port of the pressure regulator 81 for supplying the fuel to fuel injectors. A metallic return pipe 113 is connected at one end to an return port (i.e., an outlet port) of the pressure regulator 81 and at the other end to the return filter 114. The terminal 124 of the lead 123 is electrically connected to the outlet pipe of the filter casing 122 of the return filter 114 and mechanically retained thereby through a retainer 126 as shown in FIGS. 43 and 44. A jet pump 118 is connected to the outlet pipe of the return filter 114. The jet pump 118 has a pump housing made of a non-conductive resin which is supported by the bracket 106. The jet pump 118 pumps the fuel out of the sub-tank 103 through a connecting pipe 115 and transfers it into the main tank 102 through a rubber pipe 116. The jet pump 118 is designed to transfer the fuel stored in the sub-tank 103 to the main tank 102 through the connecting pipe 115 with the aid of a negative pressure or vacuum produced by the flow of fuel from the return filter 114 to the main tank 102.

A sender gage 107 which detects the surface of fuel in the main tank 102 is supported by the bracket 106. A float 108 is pivotably attached to the sender gage 107. In FIG. 41, the float 108 is under the surface of the fuel for the brevity of illustration, however, it is, in practice, on the surface of the fuel.

The pump housing 109 of the fuel pump 100 is made of a metallic member and is electrically insulated from positive and negative terminals of a power source for a pump motor disposed within the pump housing 109 and also electrically insulated from the bracket 106 through the rubber pipe 116 and the rubber cushion 105. Specifically, the pump housing 109 is electrically insulated from the vehicle body or a negative terminal of a storage battery mounted in the vehicle. The pump housing 109 stores therein a pump and a pump motor. The fuel sucked and pressurized by the pump flows through an upper portion of the pump housing 109 within which the pump motor is disposed and then is discharged from the outlet pipe.

The return filter 114 includes the filter cap 127 and the filter casing 122. The filter cap 127 is made of a non-conductive polyacetal. The filter casing 122 is made of polyacetal mixed with carbon to have conductivity. Therefore, the filter casing 122 is arranged so as to be electrically insulated from the jet pump 118 and the pressure regulator 81. In FIG. 41, an arrow indicates the flow of fuel.

According to the thirteenth embodiment, the filter casing 122 of the return filter 114 is electrically connected to the pump housing 109 through the lead 123 so that the filter casing 122 is at the same potential as that of the pump housing 109, thereby dissipating electrostatic charges generated on the filter casing 122 without use of a special electric path transmitting the electrostatic charges outside the fuel tank 101.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A fuel pump apparatus comprising:

a fuel pump retained within the fuel tank through retaining means for pumping out fuel stored within the fuel tank from an inlet and discharging the fuel through an outlet communicating with a fuel supply line and a fuel return line connected to the fuel tank, said fuel pump having a pump housing made of a conductive material insulated from a ground terminal of a power source for said fuel pump;

a filter for removing foreign substances contained in part of the fuel discharged from said fuel pump delivered to the fuel return line, said filter including a filter casing made of a conductive material which is electrically insulated from the ground terminal of the power source for said fuel pump and is supported by the retaining means; and electrical connection means for electrically connecting the pump housing of said fuel pump and the filter casing of said filter.

2. A fuel pump apparatus as set forth in claim 1, wherein the ground terminal of the power source is one of a positive terminal and a negative terminal connected to ground.

3. A fuel pump apparatus as set forth in claim 1, wherein said electrical connection means includes a conductive member elastically supported by the filter casing of said filter.

4. A fuel pump apparatus comprising:

a fuel pump retained for pumping out fuel stored within the fuel tank from an inlet and discharging the fuel through an outlet communicating with a fuel supply line and a fuel return line connected to the fuel tank, said fuel pump having a pump casing and a pump housing covered with the pump casing having disposed therein said fuel pump, the pump casing being retained by the fuel tank through retaining means and made of a conductive material insulated from a ground terminal of a power source for said fuel pump;

a filter for removing foreign substances contained in part of the fuel discharged from said fuel pump delivered to the fuel return line, said filter including a filter casing made of a conductive material which is electrically insulated from the ground terminal of the power source for said fuel pump and is supported by the retaining means; and electrical connection means for electrically connecting the pump casing of said fuel pump and the filter casing of said filter.

5. A fuel pump apparatus as set forth in claim 4, wherein the pump casing of said fuel pump electrically communicates with the pump housing.

6. A fuel pump apparatus as set forth in claim 4, wherein said electrical connection means includes a conductive member elastically supported by the filter casing of said filter.

7. A fuel pump apparatus as set forth in claim 4, wherein the pump casing of said fuel pump is made of a conductive resin, and wherein said electrical connection means includes a first engaging portion and a second engaging portion engaging with each other, the first engaging portion being formed on the pump casing of said fuel pump, the second engaging portion being formed on the filter casing of said filter.

8. A fuel pump apparatus as set forth in claim 7, wherein said first engaging portion includes a C-shaped protrusion formed on the pump casing, said second engaging portion including a T-shaped protrusion formed on the filter casing inserted into the C-shaped protrusion to achieve electrical communication between the pump casing and the filter casing.

* * * * *

UNITED STATES PATENT AND TRADEMARK OFFICE
CERTIFICATE OF CORRECTION

PATENT NO. : 5,642,718
DATED : July 1, 1997
INVENTOR(S) : NAKAI et al

It is certified that error appears in the above-identified patent and that said Letters Patent is hereby corrected as shown below:

On the title page: Item [73]

Please change:

Assignee: Nippondenso Co., Ltd., Kariya . . . . Toyota Kidosha Kabushiki . . . . of Japan"

to

Assignee: Nippondenso Co., Ltd., Kariya . . . Toyota Jidosha Kabushiki . . . . of Japan --

Signed and Sealed this

Third Day of February, 1998

Attest:

BRUCE LEHMAN

*Attesting Officer*    *Commissioner of Patents and Trademarks*